(12) United States Patent
Kawakami

(10) Patent No.: US 9,085,336 B2
(45) Date of Patent: Jul. 21, 2015

(54) BICYCLE OPERATING DEVICE

(75) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 2026 days.

(21) Appl. No.: 12/013,494

(22) Filed: Jan. 14, 2008

(65) Prior Publication Data

US 2008/0257098 A1    Oct. 23, 2008

(30) Foreign Application Priority Data

Apr. 23, 2007    (JP) .................................. 2007-112562

(51) Int. Cl.
*B62K 23/06*    (2006.01)
*B62M 25/04*    (2006.01)

(52) U.S. Cl.
CPC ............... *B62K 23/06* (2013.01); *B62M 25/04* (2013.01); *Y10T 74/20438* (2015.01)

(58) Field of Classification Search
USPC ........................................ 74/488, 489, 502.2
See application file for complete search history.

(56) References Cited

U.S. PATENT DOCUMENTS

| | | |
|---|---|---|
| 5,241,878 A | 9/1993 | Nagano |
| 5,257,683 A | 11/1993 | Romano |
| 5,400,675 A | 3/1995 | Nagano |
| 6,066,057 A | 5/2000 | Nakamura et al. |
| 6,073,730 A | 6/2000 | Abe |
| 6,216,078 B1 | 4/2001 | Jinbo et al. |
| 6,502,477 B1 | 1/2003 | Assel |
| 6,647,823 B2 | 11/2003 | Tsumiyama et al. |
| 2004/0005947 A1 | 1/2004 | Shahana et al. |
| 2007/0068313 A1 | 3/2007 | Tsumiyama |
| 2007/0068316 A1* | 3/2007 | Kawakami et al. .......... 74/502.2 |

FOREIGN PATENT DOCUMENTS

| | | |
|---|---|---|
| EP | 0 785 128 A2 | 7/1997 |
| EP | 1 481 883 A1 | 12/2004 |
| EP | 1 642 822 A2 | 5/2005 |
| EP | 1 726 520 A2 | 5/2006 |
| JP | 2004-231176 A | 8/2004 |

* cited by examiner

*Primary Examiner* — Daniel Yabut
(74) *Attorney, Agent, or Firm* — Global IP Counselors

(57) ABSTRACT

A bicycle operating device basically has a fixed member, a movable member, a positioning mechanism, a first pivoting member and a second pivoting member. The positioning mechanism is operatively arranged to selectively maintain the movable member in any one of a plurality of holding positions. The first pivoting member is pivotally mounted with respect to the fixed member to pivot about a first axis to operatively engage the positioning mechanism. The second pivoting member is pivotally mounted with respect to the fixed member to pivot about a second axis that is offset from the first axis. The second pivoting member includes first and second contacting parts for selectively contacting the first pivoting member at different radial positions causing the first pivoting member to pivot in response to pivotally movement of the second pivoting member.

11 Claims, 16 Drawing Sheets

BICYCLE OPERATING DEVICE

BACKGROUND OF THE INVENTION

1. Field of the Invention

This invention generally relates to a bicycle operating device. More specifically, the present invention relates to a bicycle operating device having a release lever that can shift several gears in a single progressive movement of the release lever.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Bicycles, and particularly sport bicycles, are often provided with gear-changing devices. A gear-change operating device (an example of a bicycle operating device) having a lever, push-button, or other type of operating member is provided to the handlebar or other part of the bicycle frame in order to operate the gear-changing device. The gear-change operating device is linked to the gear-changing device via a normal Bowden-type gear-changing cable. When the operating member is operated, the gear-changing cable moves, and the gear-changing device performs a gear-changing operation.

A conventionally well-known gear-change operating device of this type is a gear-change operating device that is capable of multi-stage (gear) release, wherein changing through a plurality of gears can be accomplished at once in a single wire releasing direction using a single progressive operation of the operating member (see, e.g., Japanese Laid-Open Patent Application No. 2004-231176). A conventional gear-change operating device is mounted within the brake lever of a racing bicycle having drop handlebars. The gear-change operating device is provided with a rotating shaft that is mounted within the brake lever in a direction crossing the brake-operating direction; a cable-interlocking article (an example of a movable member) that is rotatably mounted on the rotating shaft; a positioning body that is formed having positioning teeth on the outer circumference and that is formed integrally with the cable-interlocking article; a releasing wheel that has releasing teeth formed on the outer circumference; and a mechanism for positional retention and release (an example of a positioning mechanism) that positions the positioning teeth and has a positioning pawl, which moves in the releasing direction via the releasing teeth, and a rotation-preventing pawl, which restricts the rotational movement of the positioning body. The releasing wheel is adjacent to the positioning body and is rotatably mounted on the rotating shaft.

In this gear-change operating device, the releasing wheel is made to rotate according to the continued one-way operation of the releasing lever, which acts as the operating member, whereby the positioning mechanism, which includes the positioning pawl and the rotation-preventing pawl, can be made to operate continuously. Multi-stage release across a plurality of gears can therefore be performed in a single operation without returning the releasing lever to the operation-initiating position.

In view of the above, it will be apparent to those skilled in the art from this disclosure that there exists a need for an improved bicycle operating device. This invention addresses this need in the art as well as other needs, which will become apparent to those skilled in the art from this disclosure.

SUMMARY OF THE INVENTION

In the aforementioned conventional configuration, a single movement of the release lever allows a multi-stage release to be performed across a plurality of gears in a single-stage operation, and thus, gear-change operations across a plurality of gears can be rapidly performed. However, when wishing to perform a releasing operation for only one gear, the rider may mistakenly operate the releasing lever excessively and perform a releasing operation across a plurality of gears.

One object is to provide a bicycle operating device that is able to reliably perform single-stage gear-changing operations and a multiple stage gear-changing operations.

According to a first aspect, a bicycle operating device is provided that basically comprises a fixed member, a movable member, a positioning mechanism, a first pivoting member and a second pivoting member. The fixed member is configured to be attached to a bicycle. The movable member is movably coupled to the fixed member. The positioning mechanism is operatively arranged to selectively maintain the movable member in any one of a plurality of holding positions. The first pivoting member is pivotally mounted with respect to the fixed member to pivot about a first axis to operatively engage the positioning mechanism. The second pivoting member is pivotally mounted with respect to the fixed member to pivot about a second axis that is offset from the first axis. The second pivoting member includes first and second contacting parts for selectively contacting the first pivoting member at different radial positions that are at different radial distances from the first axis of the first pivoting member, with the first and second contacting parts contacting the first pivoting member causing the first pivoting member to pivot in response to the second pivoting member being pivoted about the second axis in a first direction.

When the second pivoting member is operated in the first direction in this gear-change operating device, one of the first and second contacting parts will contact the first pivoting member first in accordance with the operation in the first direction. The other contacting part will then make contact, and the first pivoting member will be made to pivot. The first and second contacting parts in this instance contact the first pivoting member at positions that are at different distances from the pivot point of the first pivoting member. The arm length when the contacting part that is farther from the pivot point of the first pivoting member makes contact with the first pivoting member will therefore be longer than when the closer contacting part makes contact, and the first pivoting member can be made to pivot using a weaker force. The operating force is therefore lightened when pivoting is caused by the far contacting part, and the force for operating the second pivoting member changes according to whichever of the contacting parts is in contact. Therefore, the positions of the first and second contacting parts are set so that contact is made using a different contacting part when changing from a single-stage operation to a continuous two-stage operation, whereby the operating force of the second pivoting member can be made to change at the point in time when the single-stage operation ends. A single-stage operation can thereby be performed by ending the operation at the point in time when the operating force changes, and an operation across multiple stages can be performed by continuing operation even after the change. Single-stage operations and operations across multiple stages can therefore be reliably performed.

According to a second aspect, the bicycle operating device according to the first aspect is further configured such that the first contacting part of the second pivoting member is arranged to contact the first pivoting member at a position that is farther from the first axis than the second contacting part; and the first contacting part of the second pivoting member is further arranged to initially causes the first pivoting member to pivot in response to the second pivoting member being initially pivoted about the second axis in the first direction, and then the second contacting part of the second pivoting member causes the first pivoting member to pivot in response to further pivotal movement of the second pivoting member pivoting about the second axis in the first direction. The first contacting part, which contacts first at a position farther from the pivot point of the first pivoting member, causes the first pivoting member to pivot, and therefore the second pivoting member can be operated using light force. The second contacting part, which contacts at a position close to the pivot point in this instance, then causes the first pivoting member to pivot, and therefore when a single-stage operation finishes both contacting parts will be positioned so that contact is made at the second contacting part away from the first contacting part, whereby the force necessary for operating the second pivoting member increases, and the operation encounters resistance. The rider can recognize that a single-stage operation has finished due to the resistance encountered during the operation. A single-stage operation can be reliably ended by ending the operation at the point in time when the operation encounters resistance, and an operation across multiple stages can be performed by continuing the operation after resistance is encountered. Settings can thus be made so that the operation encounters resistance when a single-stage operation finishes, and therefore single-stage operations can be easily recognized. The operation encounters resistance when an operation is attempted across multiple stages, and therefore operations across multiple stages must be consciously performed. Single-stage operations and operations across multiple stages can therefore be reliably performed.

According to a third aspect, the bicycle operating device according to the second aspect is further configured such that the positioning mechanism and the first pivoting member are arranged such that the movable member is moved by one increment in response to the first pivoting member being initially pivoted by the first contacting part. The movable member in this instance can be moved one step via the pivoting of the first pivoting member due to the first contacting part, and an operation can be performed for changing the holding position by one stage.

According to a fourth aspect, the bicycle operating device according to the third aspect is further configured such that the positioning mechanism and the first pivoting member are arranged such that the movable member is moved by one more increment in response to the first pivoting member being initially pivoted by the second contacting part. The first pivoting member is made to pivot by resistant operating force due to the second contacting part in this instance, whereby the holding position of the movable member can be moved by one more increment. A single operation can therefore be performed for changing the holding position of the movable member by a total of two stages.

According to a fifth aspect, the bicycle operating device according to any one of the first to fourth aspects is further configured such that the second pivoting member is further configured to pivot in a second direction, which is opposite from the first direction, and the first and second pivoting members being arranged to cause the first pivoting member to pivot in response to the second pivoting member being pivoting in the second direction. The first pivoting member can be made to pivot in this instance even when the second pivoting member is made to pivot in the second direction. The movable member can therefore be made to move due to pivoting of the second pivoting member in both directions.

According to a sixth aspect, the bicycle operating device according to the fifth aspect is further configured such that the second pivoting member further comprises third and fourth contacting parts that selectively contact the first pivoting member at different radial positions that are at different radial distances from the first axis of the first pivoting member; and the second pivoting member is further such that one of the third and fourth contacting parts contacts the first pivoting member causing the first pivoting member to pivot in response to the second pivoting member being pivoting in the second direction. When the second pivoting member pivots in the second direction in this instance, the positions of the third and fourth contacting parts are also set in the same manner as pivoting in the first direction so that contact is made using a different contacting part when changing from a single-stage operation to a continuous two-stage operation, whereby the operating force can be made to change at the point in time when the single-stage operation ends. Single-stage operations and operations across multiple stages can be reliably performed even when the second pivoting member operates in the second direction.

According to a seventh aspect, the bicycle operating device according to the sixth aspect is further configured such that the third contacting part of the second pivoting member is arranged to contact the first pivoting member at a position that is farther from the first axis than the fourth contacting part; and the third contacting part of the second pivoting member is further arranged to initially causes the first pivoting member to pivot in response to the second pivoting member being initially pivoted about the second axis in the second direction, and then the fourth contacting part of the second pivoting member causes the first pivoting member to pivot in response to further pivotal movement of the second pivoting member pivoting about the second axis in the second direction. Force is transmitted from the second pivoting member to the first pivoting member in this instance by the third contacting part in the same manner as pivoting in the first direction. The third contacting part contacts first at a position farther from the pivot point, and therefore the second pivoting member can be operated using light force. The fourth contacting part, which contacts at a position close to the pivot point, then causes the first pivoting member to pivot, and therefore when a single-stage operation finishes both contacting parts will be positioned so that contact is made at the fourth contacting part away from the third contacting part, whereby the force necessary for operating the second pivoting member increases, and the operation encounters resistance. The rider can recognize that a single-stage operation has finished due to the resistance encountered during the operation. A single-stage operation can be reliably ended by ending the operation at the point in time when the operation encounters resistance, and an operation across multiple stages can be performed by continuing the operation after resistance is encountered. Settings can thus be made so that the operation encounters resistance when a single-stage operation finishes even when the second pivoting member is made to pivot in the second direction, and therefore single-stage operations can be easily recognized. The operation encounters resistance when an operation is attempted across multiple stages, and therefore operations across multiple stages must be consciously performed. Single-stage operations and operations across multiple stages can therefore be reliably performed even when the second pivoting member is made to pivot in the second direction.

According to the present invention, the first and second contacting parts contact the first pivoting member at positions that are at different distances from the pivot point of the first pivoting member. The arm length when the contacting part that is farther from the pivot point of the first pivoting member makes contact with the first pivoting member will therefore be longer than when the closer contacting part makes contact, and the first pivoting member can be made to pivot using a weaker force. The operating force is therefore lightened when pivoting is caused by the far contacting part, and the force for operating the second pivoting member changes according to whichever of the contacting parts is in contact. Therefore, the positions of the first and second contacting parts are set so that contact is made using a different contacting part when changing from a single-stage operation to a continuous two-stage operation, whereby the operating force of the second pivoting member can be made to change at the point in time when the single-stage operation ends. A single-stage operation can thereby be performed by ending the operation at the point in time when the operating force changes, and an operation across multiple stages can be performed by continuing operation even after the change. Single-stage operations and operations across multiple stages can therefore be reliably performed.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
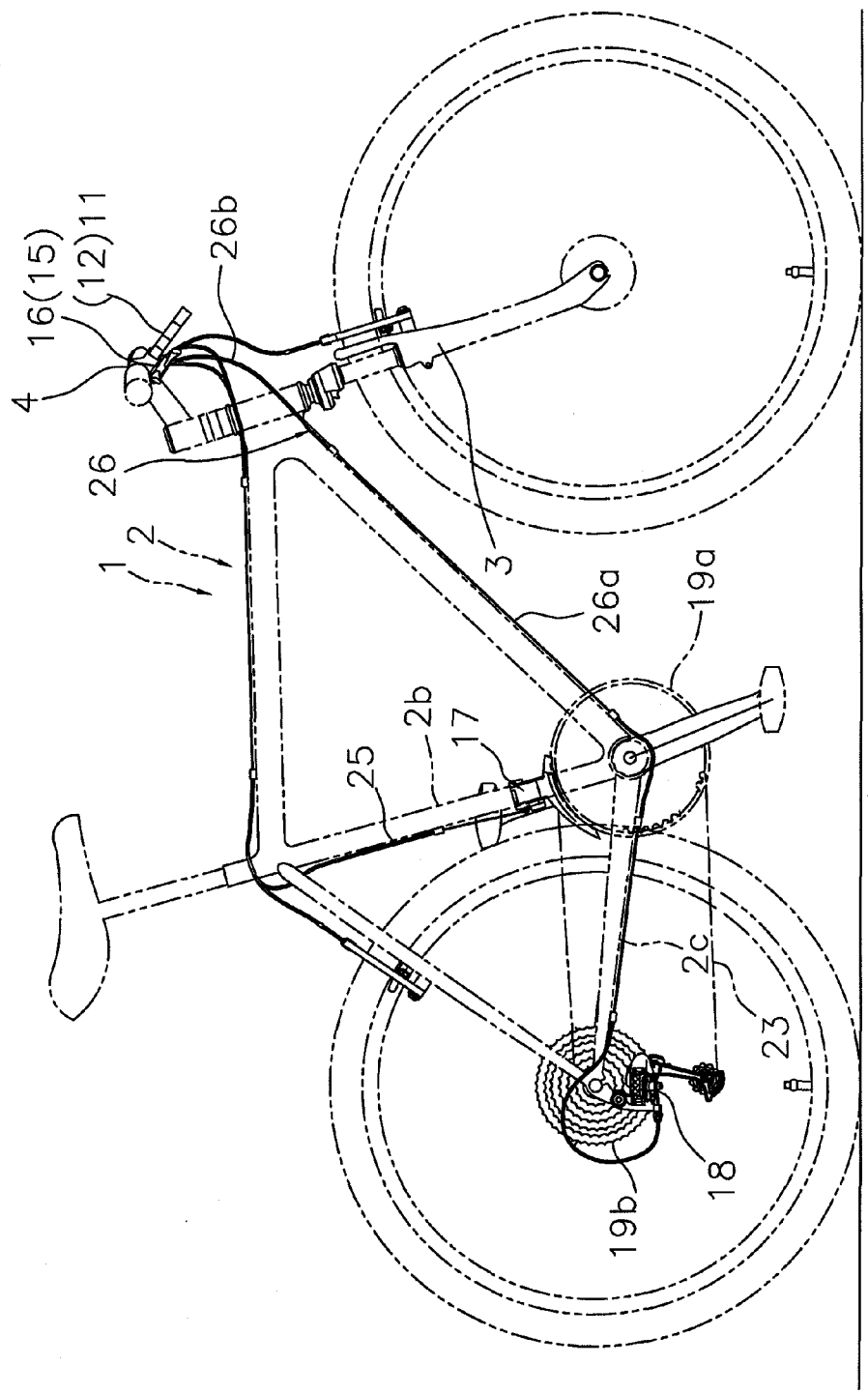
FIG. 1 is a side elevational view of a bicycle equipped with a bicycle operating device in accordance with one embodiment.

Referring initially to FIG. 1, a bicycle 1 is illustrated that is equipped a first embodiment of the present invention. The bicycle 1 includes a frame 2 with a suspension fork 3 and a handlebar 4. The handlebar 4 is fixed to an upper part of the suspension fork 3. A front derailleur 17 is mounted in the middle part of the frame 2. A rear derailleur 18 is mounted on the rear-end part of the frame 2. The derailleurs 17 and 18 constitute externally mounted gear-changing devices. The front derailleur 17 is positioned, e.g., on the bottom part of the seat tube 2b of the frame 2 and guides a chain 23 to any of the sprockets of a front gear 19a, which has, e.g., three sprockets. The rear derailleur 18 is positioned on the rear-end part of the chain stay 2c of the frame 2 and guides the chain 23 to any of the sprockets of a rear gear 19b, which has, e.g., nine sprockets. The front and rear derailleurs 17 and 18 are linked to front and rear gear-change operating devices 15 and 16 via front and rear gear-changing cables 25 and 26. The front and rear gear-change operating devices 15 and 16 are examples of bicycle operating devices.

The front and rear gear-change operating devices 15 and 16 are positioned on the handlebar 4 in proximity to a pair of brake levers 11 and 12. The front gear-change operating device 15 and the rear gear-change operating device 16 are mirror images of each other. Except for the number of gears, the gear-change operating devices have substantially identical configurations and operation, and therefore the explanations of configuration and operation hereinafter will be for the rear gear-change operating device 16.

Figure 2:
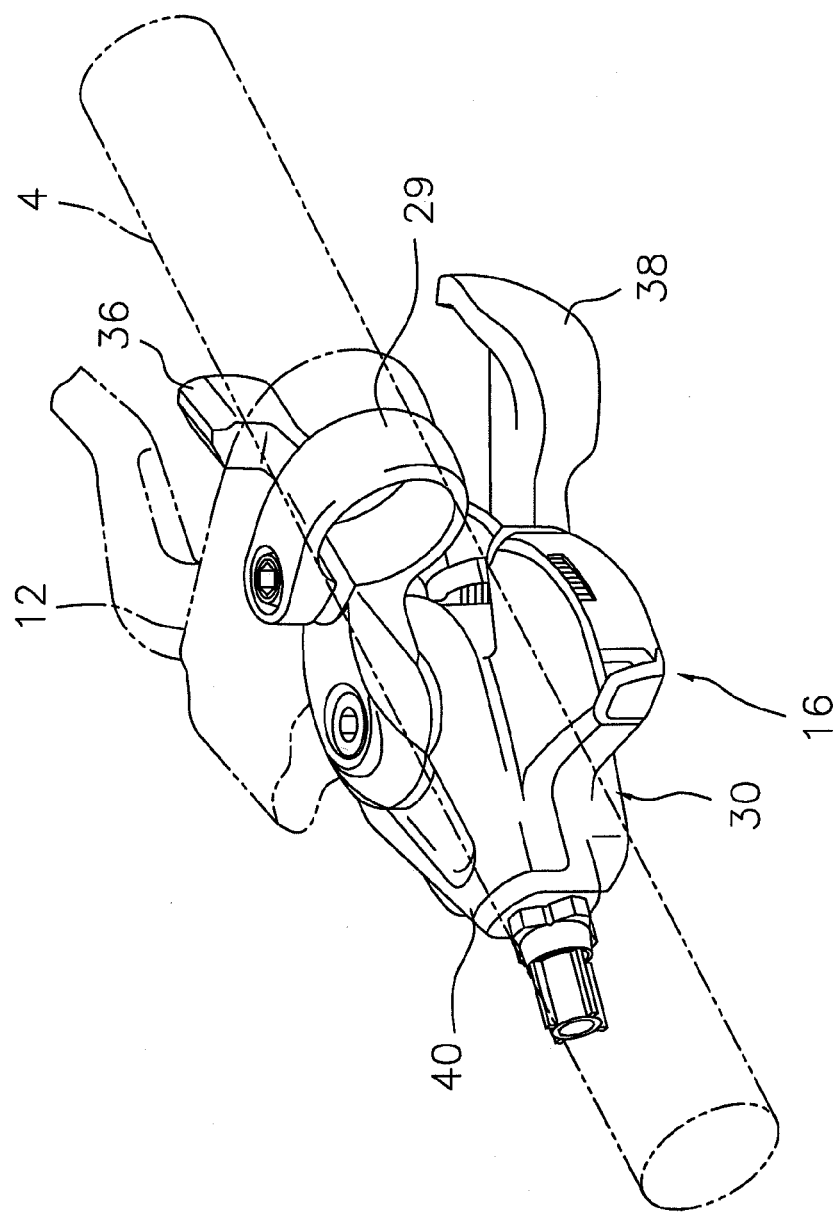
FIG. 2 is a perspective view of a rear gear-change operating device according to the illustrated embodiment.
Figure 3:
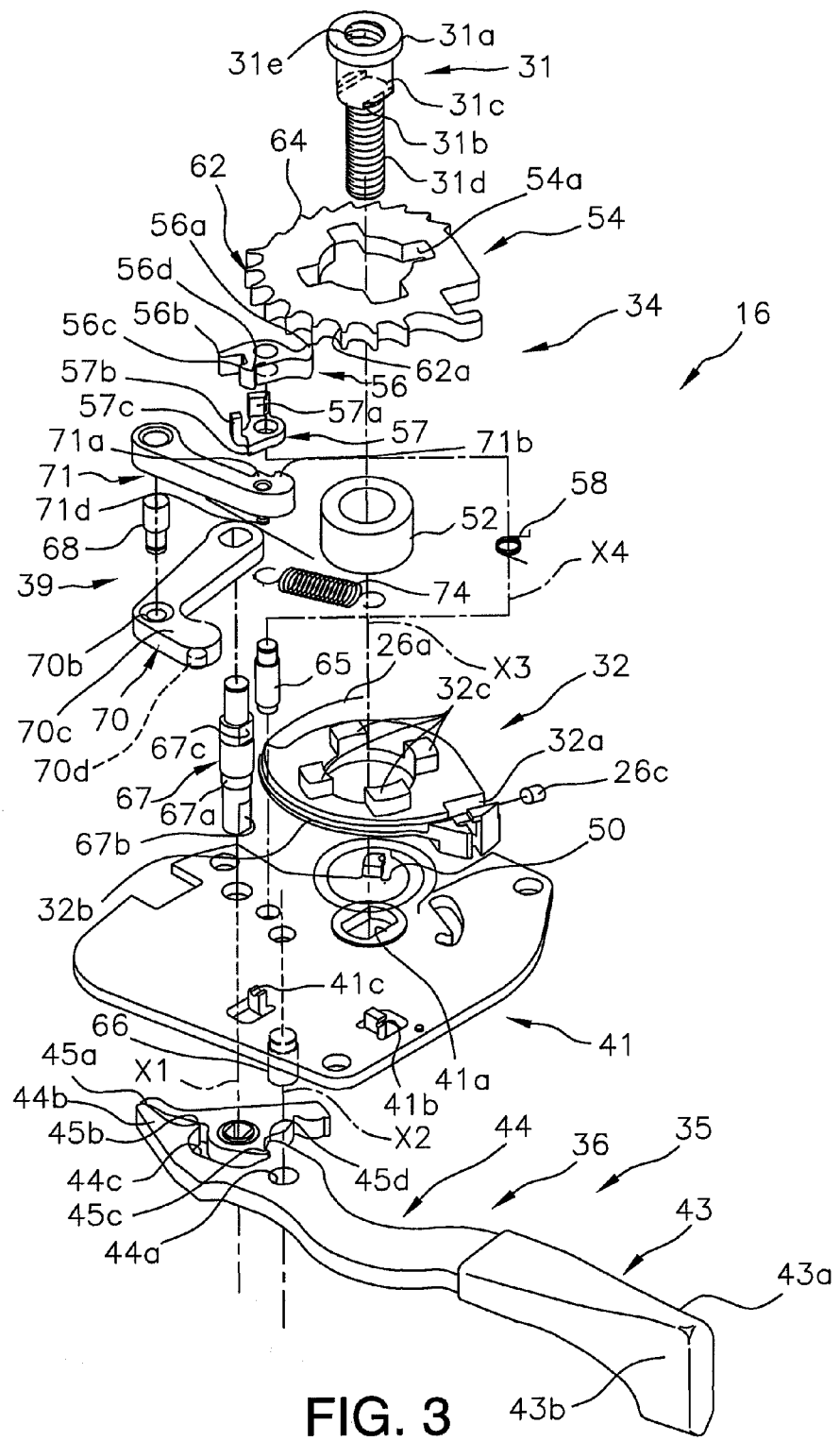
FIG. 3 is an exploded perspective view of selected parts of the rear gear-change operating device illustrated in FIG. 2.

The main elements of the rear gear-change operating device 16 according are shown in FIG. 3 vertically inverted relative to FIG. 2. The rear gear-change operating device 16 has a fixed member 30 that is capable of attaching to the handlebar 4 on the inner side of the rear brake lever 12, as shown in FIG. 2. The fixed member 30 can also be integrally fixed to the bracket of the rear brake lever 12. The fixed member 30 is fixed to the handlebar 4 by a band clamp 29.

As shown in FIG. 3, the rear gear-change operating device 16 is linked to an attachment bracket 41 (described hereinafter) of the fixed member 30 so as to perform a wire winding operation and a wire releasing operation. The rear gear-change operating device has a wire takeup (movable) member 32, a positioning mechanism 34, a releasing lever and a winding lever 38. The wire takeup member 32 is selectively held in one of a plurality of predetermined holding positions by the positioning mechanism 34. The positioning mechanism 34 is arranged to positional maintain and release the wire takeup member 32. The releasing lever 35 is arranged to perform the wire releasing operation such that the wire takeup member 32 rotates in a wire releasing direction. The releasing lever 35 constitutes first and second pivoting members as explained below. The winding lever 38 is arranged to perform the wire releasing operation the wire takeup member 32 rotates in a wire winding direction.

Figure 4:
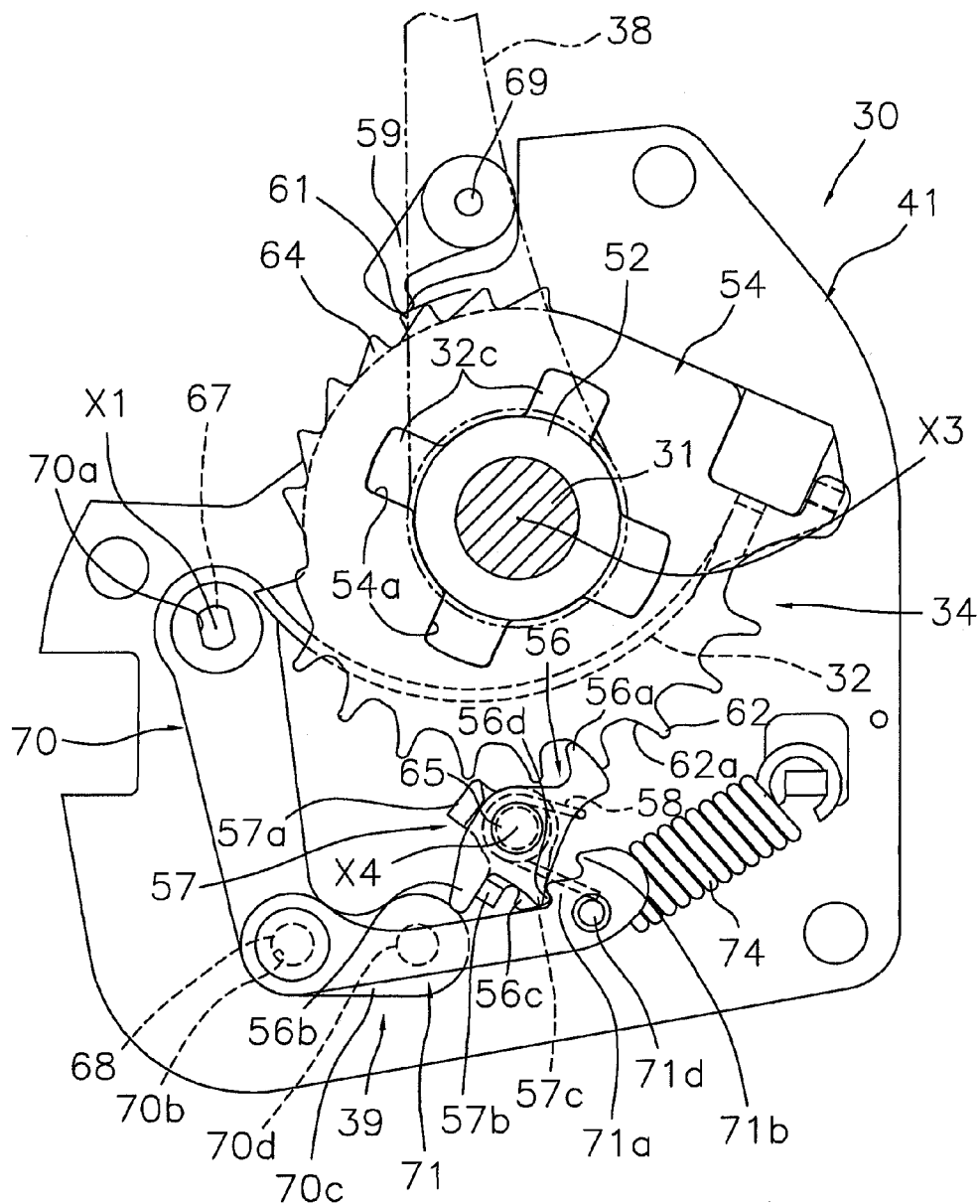
FIG. 4 is a plan view of the rear gear-change operating device when the positioning pawl is in the first engagement position.

As shown in FIG. 2 through 5, the fixed member 30 can be mounted on the handlebar 4. The fixed member 30 primarily comprises a casing 40 and an attachment bracket 41 (FIGS. 3 and 4). The casing 40 is made of, e.g., a synthetic resin and defines an empty interior space. The attachment bracket 41 is provided within the interior of the casing 40. The fixed member 30 has a supporting shaft 31 that is linked to the attachment bracket 41. The attachment bracket 41 is a metal plate-shaped member. The supporting shaft 31 is non-rotatably linked to the attachment bracket. The wire takeup member 32, the positioning mechanism 34, the releasing lever 35 and the winding lever 38 are movably linked to the attachment bracket 41. The configurations of these parts and the details of the configurations for linking to the attachment bracket 41 will be described in the descriptions for each part.

The supporting shaft 31 in FIG. 3 is positioned along a third axis X3 that passes through a slot-shaped aperture 41a of the attachment bracket 41. A circular head part 31a is formed on the base end (the end at the top of FIG. 3) of the supporting shaft 31. A rotational support part 31c is formed in the middle part, and mutually parallel chamfered parts 31b are formed on the bottom end of the rotational support part. A male screw part 31d is formed on the bottom part of the supporting shaft 31, and a female screw part 31e is formed on the head part 31a. A bolt (not shown) passes through the casing 40 and screws into the female screw part, and the supporting shaft 31 is fixed to the casing 40. The chamfered parts 31b engage with the aperture 41a, and the supporting shaft 31 is non-rotatably linked to the attachment bracket 41.

The wire takeup member 32 is a member made of, e.g., polyacetal or another synthetic resin. The wire takeup member is positioned on the first surface (the upper surface in FIG. 3) of the attachment bracket 41 and is mounted so as to be able to rotate around the third axis X3 in the wire winding direction and the wire releasing direction on the rotational support part 31c of the supporting shaft 31 via a bushing 52. The wire takeup member 32 has an inner interlocking part 32a and a wire winding groove 32b on the outer circumferential surface. The inner interlocking part interlocks with a cable nipple 26c that is fixed to the end of an inner cable 26a of a rear gear-changing cable 26. The wire winding groove is for winding the inner cable 26a. The wire takeup member 32 is urged in the wire releasing direction (the clockwise direction in FIG. 3) by a spring member 50 having the form of, e.g., a spiral spring. One end of the spring member 50 is fixed to the wire takeup member 32, and the other end is fixed to the attachment bracket 41. On the upper surface of the wire takeup member 32 are formed, e.g., four engagement protrusions 32c for gearing with and causing rotation of a positioning member 54 (described hereinafter) of the positioning mechanism 34. One of the four engagement protrusions 32c has a different length in the circumferential direction. The relative rotations of the positioning member 54 and the wire takeup member 32 can thereby be properly coordinated.

The positioning mechanism 34 is positioned on the first-surface side of the attachment bracket 41. The positioning mechanism 34 has, e.g., nine positioning teeth 62 and eight winding teeth 64. The positioning mechanism 34 has the positioning member 54 for linking to the wire takeup member 32 and has a positioning pawl 56 for pivoting between a first engagement position (shown in FIG. 4) where the positioning teeth 62 are engaged and a first releasing position (shown in FIG. 10) where the positioning teeth 62 are not engaged. The positioning mechanism 34 also has a rotation-preventing pawl 57 for pivoting between a second engagement position (shown in FIG. 10) where the positioning teeth 62 are engaged at a different location from the positioning pawl 56 and a second releasing position (shown in FIG. 4) where the positioning teeth 62 are not engaged. The positioning mechanism 34 also has a winding pawl 59 for engaging with and detaching from the winding teeth 64.

The positioning member 54 is positioned in contact with the upper surface of the wire takeup member 32 in FIG. 3. The positioning member 54 is a ratchet plate that has engagement holes 54a for engaging with the engagement protrusions 32c of the wire takeup member 32. The positioning member 54 rotates integrally with the wire takeup member 32. The positioning teeth 62 and the winding teeth 64 are provided in numbers corresponding to the gearing positions on the rear derailleur 18 and are formed protruding radially toward the outer circumferential surface of the positioning member 54. The positioning member 54 and the wire takeup member 32 are urged in the wire releasing direction (the clockwise direction in FIG. 3) by the spring member 50. The intervals between the positioning teeth 62 and the winding teeth 64 are determined on the basis of the amount of cable movement, which is set in accordance with the gearing positions of the rear derailleur 18.

The positioning pawl 56 is provided passing through the attachment bracket 41 and is pivotally mounted on a pivoting shaft 65 that is positioned along a fourth axis X4 parallel to the third axis X3. The pivoting shaft 65 rises from the first surface (the upper surface in FIG. 3) of the attachment bracket 41. The positioning pawl 56 is urged in the counter-clockwise direction of FIG. 3 by a spring member 58 having the form of, e.g., a torsion coil spring so that the positioning pawl 56 is positioned in the first engagement position. One end of the spring member 58 is fixed to a spring bearing 41c (FIG. 3) formed on the attachment bracket 41, and the other end is fixed to the positioning pawl 56.

The positioning pawl 56 contacts the engagement surfaces 62a of the positioning teeth 62. The positioning pawl 56 has a first pawl part 56a, a pair of restricting protrusions 56b and 56c and an engagement protrusion 56d. The first pawl part 56a is configured and arranged to block rotation in the wire releasing direction of the positioning member 54 that is urged in the clockwise direction of FIG. 3. The restricting protrusions 56b and 56c is configured and arranged to restrict the pivoting range of a rotation-preventing pawl 57. The engagement protrusion 56d is configured and arranged to engage with a driving mechanism 39. The first pawl part 56a is formed protruding toward the positioning member 54 to an end that extends along the positioning member 54 from the center of rotation. The restricting protrusions 56b and 56c are separated by a gap and extend in the opposite direction from the first pawl part 56a. The restricting protrusion 56b is formed in a position that allows the rotation-preventing pawl 57 to be positioned in the second releasing position when the positioning pawl 56 is in the first engagement position. The restricting protrusion 56c is provided so as to allow the rotation-preventing pawl 57 to release the engagement of the positioning pawl 56 and a second arm member 71 of the driving mechanism 39 (described hereinafter) by pivoting within a prescribed range. The engagement protrusion 56d protrudes slightly toward the second arm member 71 so as to be capable of engaging with two operating parts 71a and 71b of the second arm member 71.

The rotation-preventing pawl 57 is rotatably mounted on the pivoting shaft 65 below the positioning pawl 56 and is able to pivot in a prescribed range (e.g., a range of 5° to 10°) relative to the positioning pawl 56. In order to implement this state, the rotation-preventing pawl 57 has a second pawl part 57a, a restricting part 57b and a releasing cam part 57c. The second pawl part 57a bends upward from below the positioning pawl 56 in FIG. 3 and engages with the positioning teeth 62. The restricting part 57b bends upward so as to be positioned between the pair of restricting protrusions 56b and 56c. The releasing cam part 57c is capable of contacting the two operating parts 71a and 71b of the second arm member 71.

Figure 10:
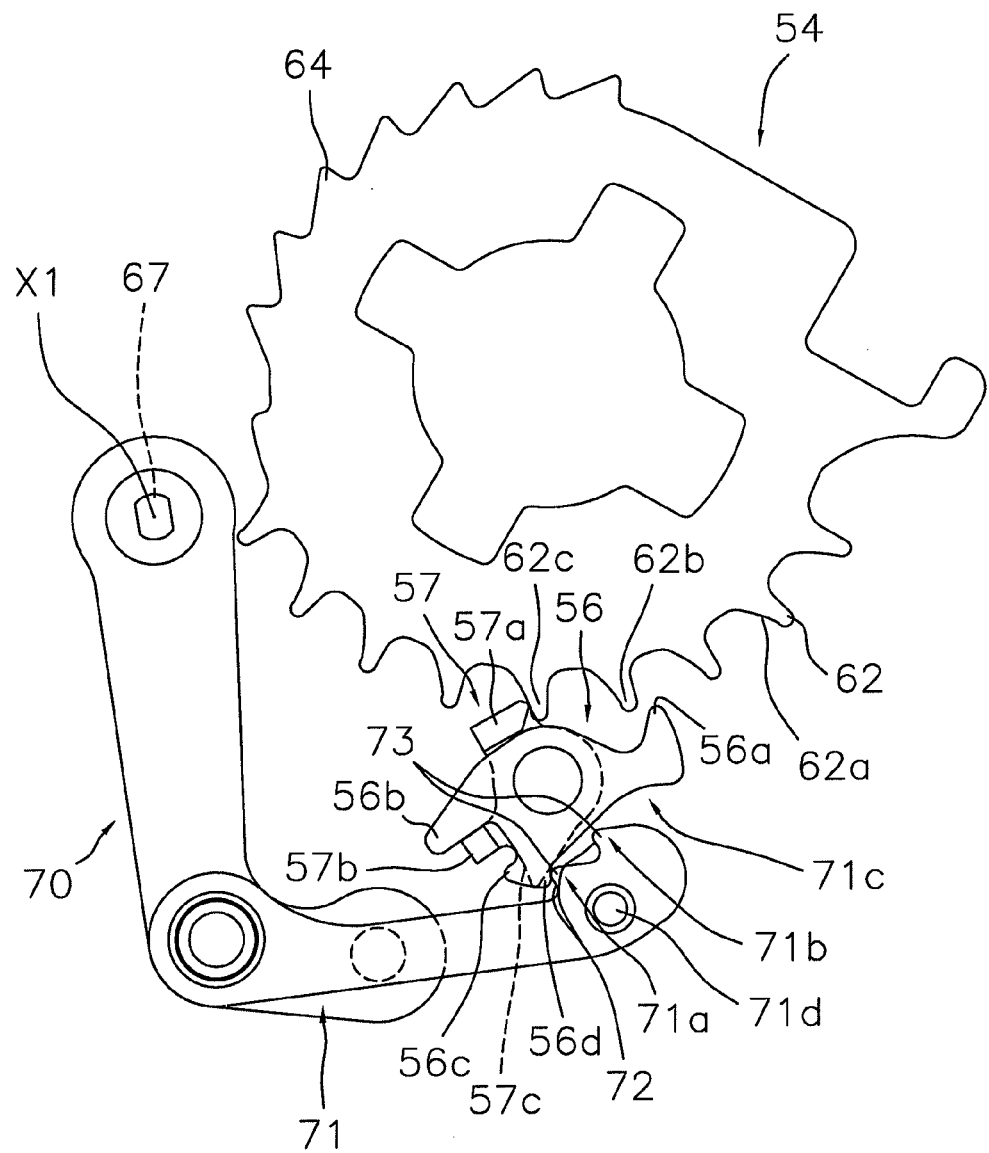
FIG. 10 is a partial plan view of selected parts of the rear gear-change operating device showing part of the wire releasing operation.

The restricting part 57b is formed so as to come into contact with the restricting protrusion 56b and to allow the rotation-preventing pawl 57 to move from the second engagement position to the second releasing position when the positioning pawl 56 moves from the first releasing position shown in FIG. 10 to the first engagement position shown in FIG. 4.

The releasing cam part 57c is formed so as to move from the second releasing position toward the second engagement position along with the positioning pawl 56 when the positioning pawl 56 is made to move from the first engagement position to the first releasing position by the driving mechanism 39. The releasing cam part 57c is also provided to release the engagement of the driving mechanism 39 to the positioning pawl 56 when the positioning teeth 62 contact the second pawl part 57a and the rotation-preventing pawl 57 rotates within the prescribed range when the releasing cam part is in the second engagement position. The releasing cam part 57c is overlapped by the restricting protrusion 56c and hidden as shown in FIG. 10 when the restricting part 57b contacts the restricting protrusion 56b.

As shown in FIG. 10, when the rotation-preventing pawl 57 moves to the second engagement position, the rotation-preventing pawl contacts the next positioning tooth 62c upstream in the wire releasing direction from the positioning tooth 62b that was in contact with the positioning pawl 56. Once the positioning pawl 56 has disengaged, the rotation-preventing pawl prevents the positioning member 54 from continuing a further rotation in the wire releasing direction. As shown in FIG. 4, when the rotation-preventing pawl 57 is in the second engagement position, the positioning pawl 56 is positioned in a location in which the pawl rides over the positioning tooth 62b that was engaged.

The winding pawl 59 is pivotally mounted on a pivoting shaft 69 that rises from the winding lever 38, as shown in FIG. 4. The winding pawl 59 is urged in the counter-clockwise direction of FIG. 4 by a torsion coil spring or other spring member (not shown) so as to be located in the winding position. The winding pawl 59 is located in a position removed from the winding teeth 64 when the winding lever 38 is in the operation-initiating position due to a holding plate 61 provided to the attachment bracket 41. When the winding lever 38 is operated, the winding pawl 59 moves from the end of the holding plate 61 and enmeshes with the winding teeth 64, and the positioning member 54 is made to rotate in the wire winding direction (the counter-clockwise direction in FIG. 4).

The releasing lever 35 has a lever member 36, which is an example of a second pivoting member. The lever member 36 is configured and arranged to perform a wire releasing operation. The lever member 36 includes the driving mechanism 39 for causing the positioning mechanism 34 to perform a releasing operation across a plurality of gears in a single progressive operation of the lever member 36. The driving mechanism 39 includes a driving member 42, which is an example of a first pivoting member that pivots via the pivoting of the lever member 36.

Figure 5:
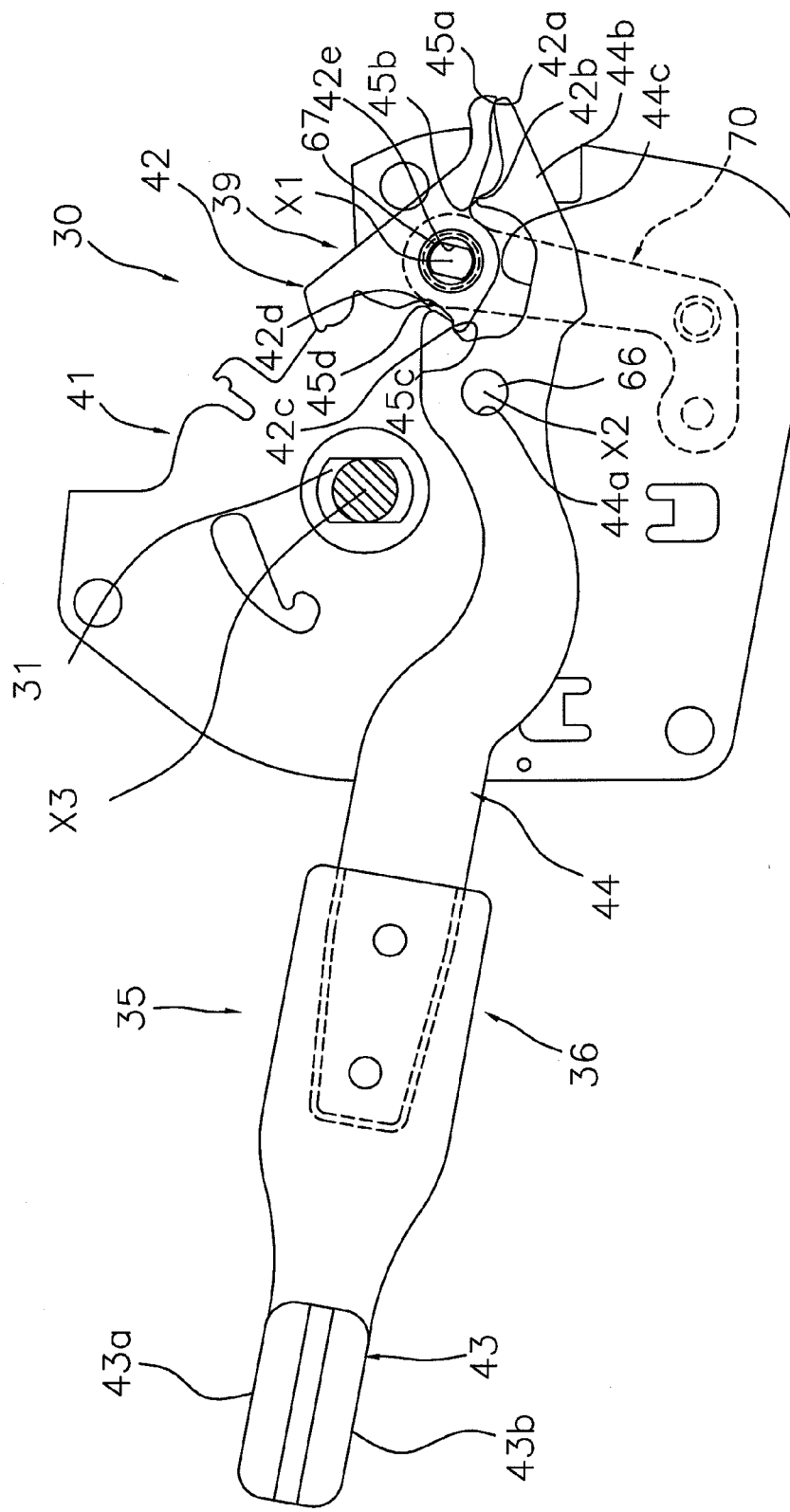
FIG. 5 is a plan view of the rear gear-change operating device when the releasing lever is in an intermediate position.

The lever member 36 is positioned on a second surface (the lower surface in FIG. 3) of the attachment bracket 41, as shown in FIGS. 3 and 5. The lever member 36 is pivotally supported by a pivoting shaft 66 that rises up along a second axis X2 from the second surface of the attachment bracket 41.

As seen in FIG. 5, the lever member 36 pivots from the neutral position around the pivoting shaft 66 in the first direction (the counter-clockwise direction in FIG. 5) and the second direction (the clockwise direction in FIG. 5). The lever member 36 is urged into the neutral position via the driving mechanism 39.

As shown in FIGS. 3 and 5, the lever member 36 has a knob part 43, lever part 44 and first through fourth contacting parts 45a through 45d. The lever part 44 is linked to the base of the knob part 43. The first through fourth contacting parts 45a through 45d are provided to the lever part 44 and are capable of contacting the driving member 42. The knob part 43 is made of, e.g., synthetic resin or die-cast metal and has first and second operating surfaces 43a and 43b for operation in both the first and second directions in order to allow operations to be performed easily in the first and second directions.

The lever part 44 is, e.g., a plate-shaped member made of steel, a stainless steel alloy, or another metal and is made to bend slightly in the middle so as to avoid the supporting shaft 31. A pivot supporting part 44a is supported by the pivoting shaft 66. The pivot supporting part 44a is in the form of a through-hole that is formed on the distal side of the bending portion. A pivot operating part 44b is formed further to the distal end than the pivot supporting part 44a. The pivot operating part 44b has an end that has the form of a pointed beak. A concave part 44c is formed on the pivot operating part 44b so as to avoid the driving member 42. The first through fourth contacting parts 45a through 45d are formed on both sides of the concave part 44c.

Figure 6:
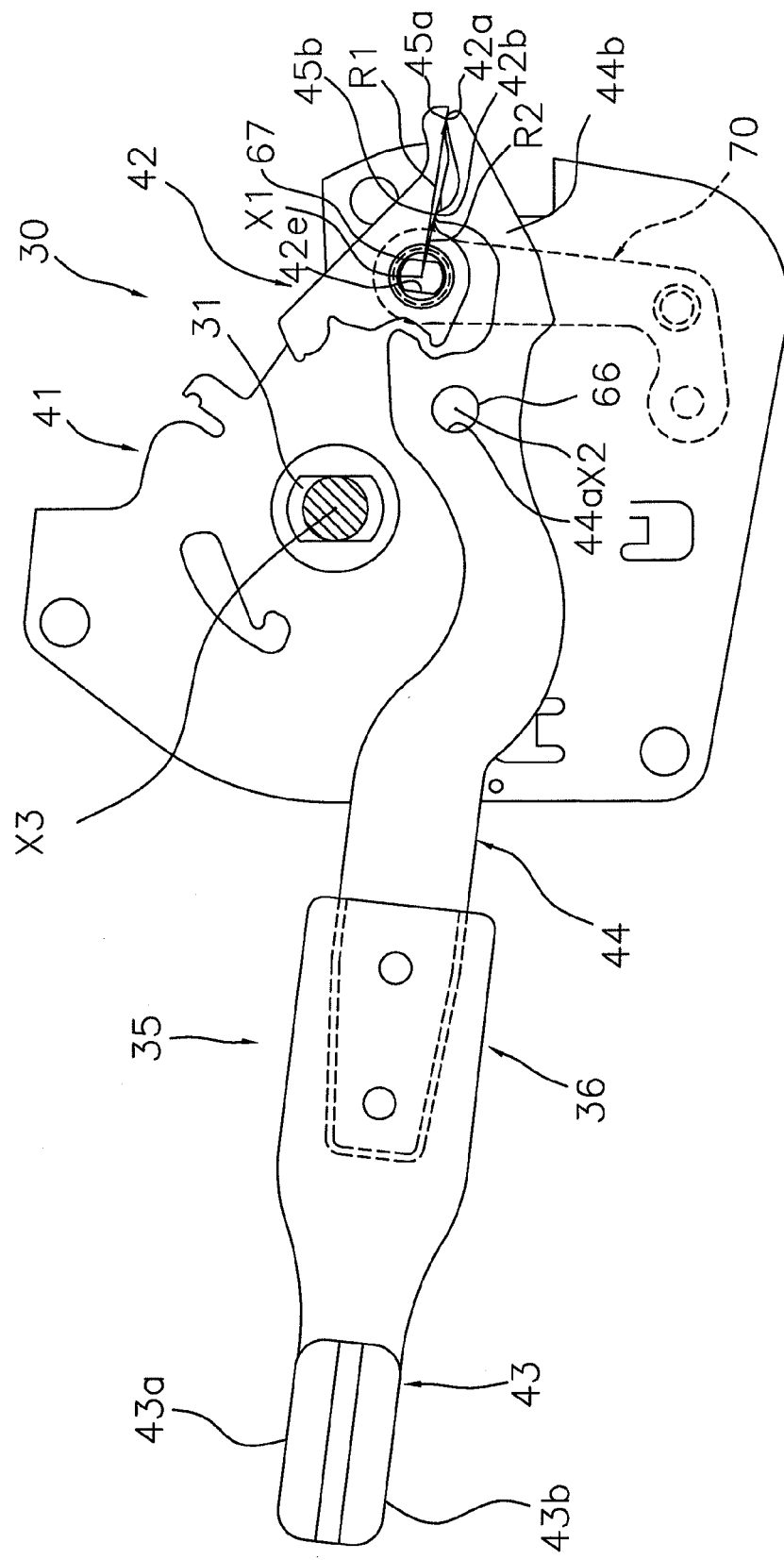
FIG. 6 is a plan view of the rear gear-change operating device when the releasing lever moves one step in the first direction.
Figure 7:
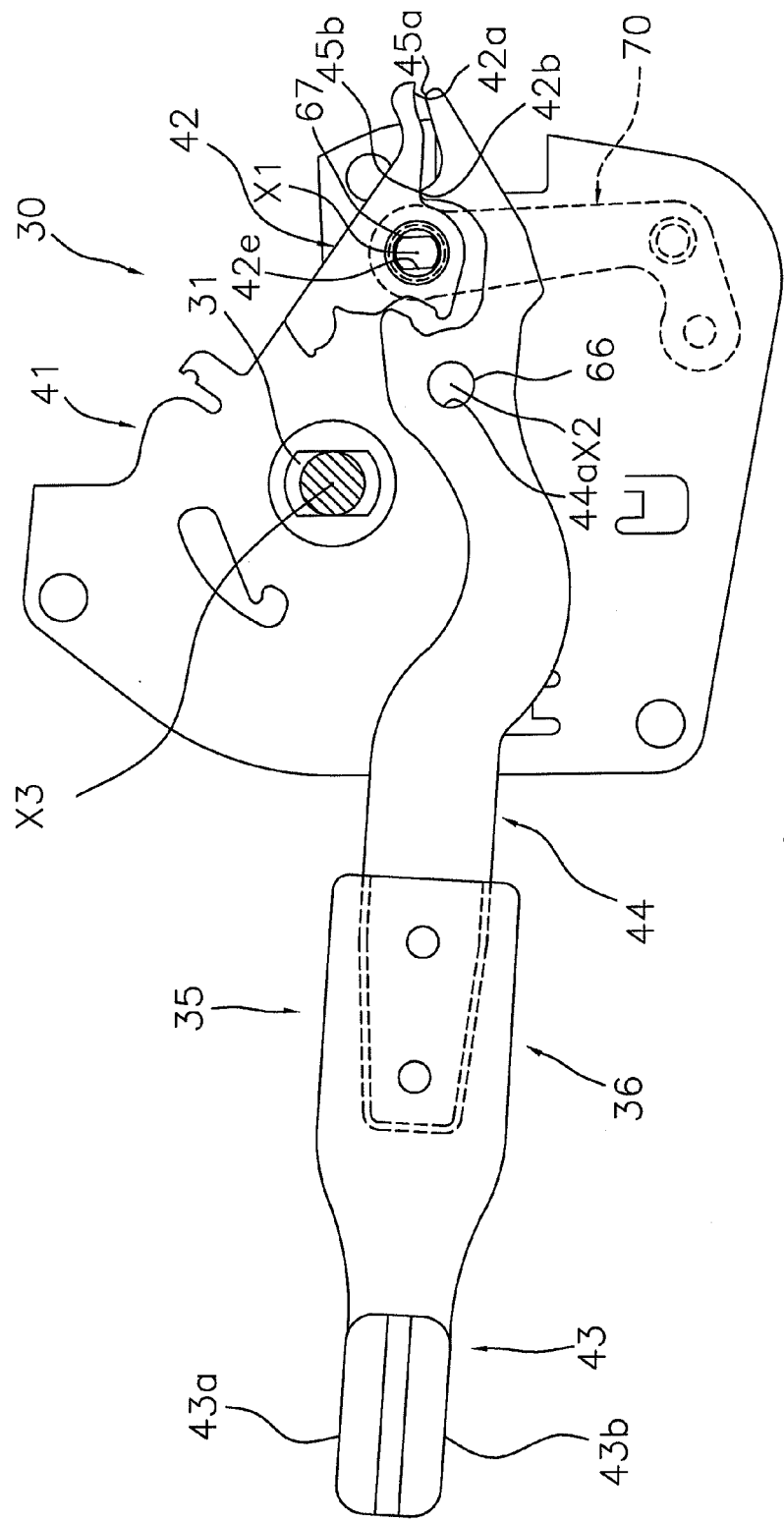
FIG. 7 is a plan view of the rear gear-change operating device when the releasing lever moves two steps in the first direction.

The first contacting part 45a is formed in a rounded shape on the end of the pivot operating part 44b, as shown in FIG. 6. When the lever member 36 pivots in the first direction, the first contacting part 45a contacts the driving member 42 at a position that is a distance R1 from a first axis X1, which is the pivot point of the driving member 42, before the second contacting part 45b. The second contacting part 45b is formed protruding toward the driving member 42 on one end of the concave part 44c of the pivot operating part 44b. The second contacting part 45b contacts the driving member 42 at a position that is a distance R2, which is shorter than the distance R1, from the first axis X1 after the first contacting part 45a has pivoted in a state of contact with the driving member 42. When the lever member 36 pivots further in the first direction after the second contacting part 45b has made contact, the first contacting part 45a separates from the driving member 42, as shown in FIG. 7. The point in time when the second contacting part 45b contacts the driving member 42 is the point in time when the gear changing operation has moved one stage in the releasing direction due to the releasing operation, which is described hereinafter.

Figure 8:
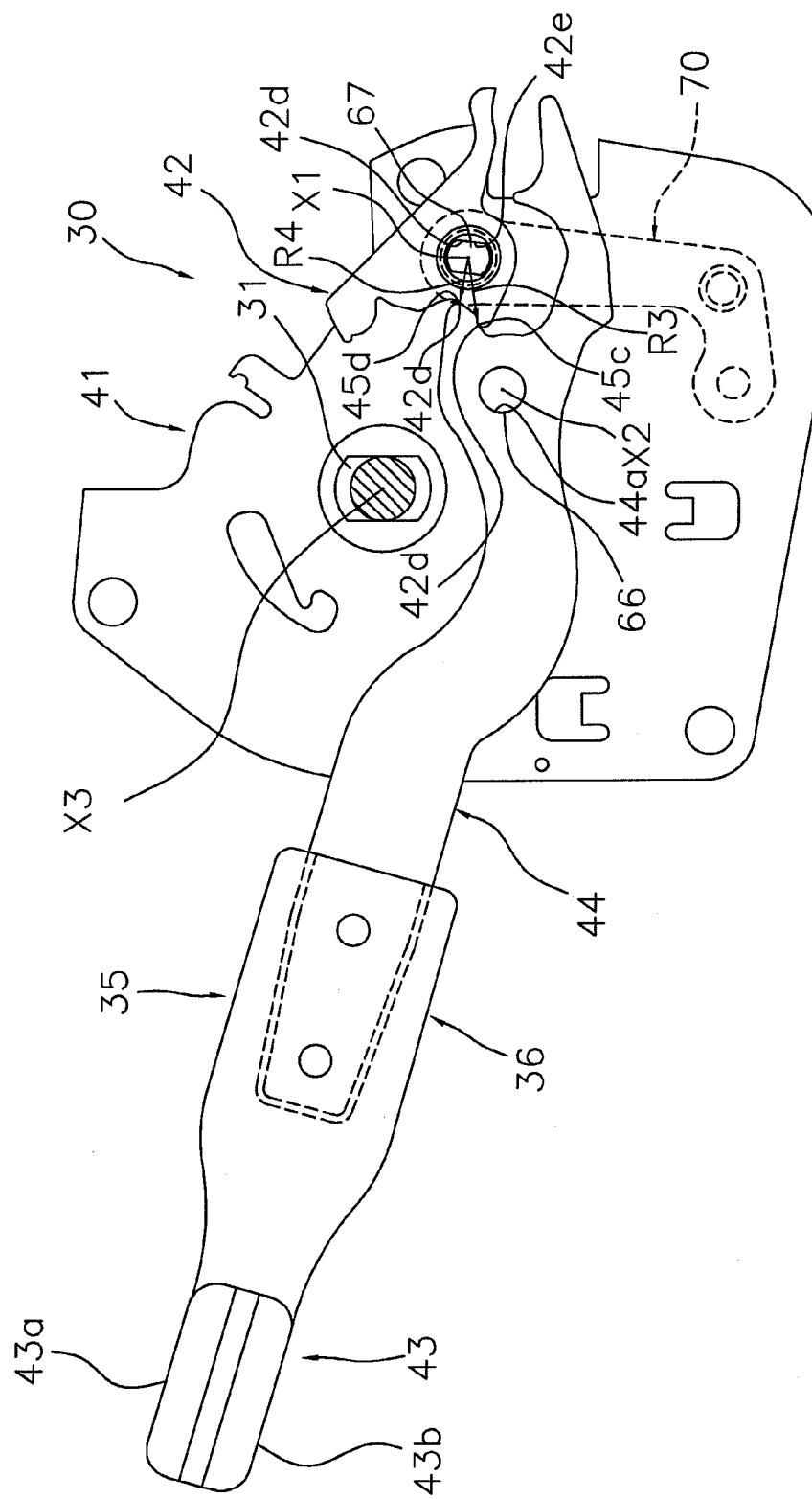
FIG. 8 is a plan view of the rear gear-change operating device when the releasing lever moves one step in the second direction.
Figure 9:
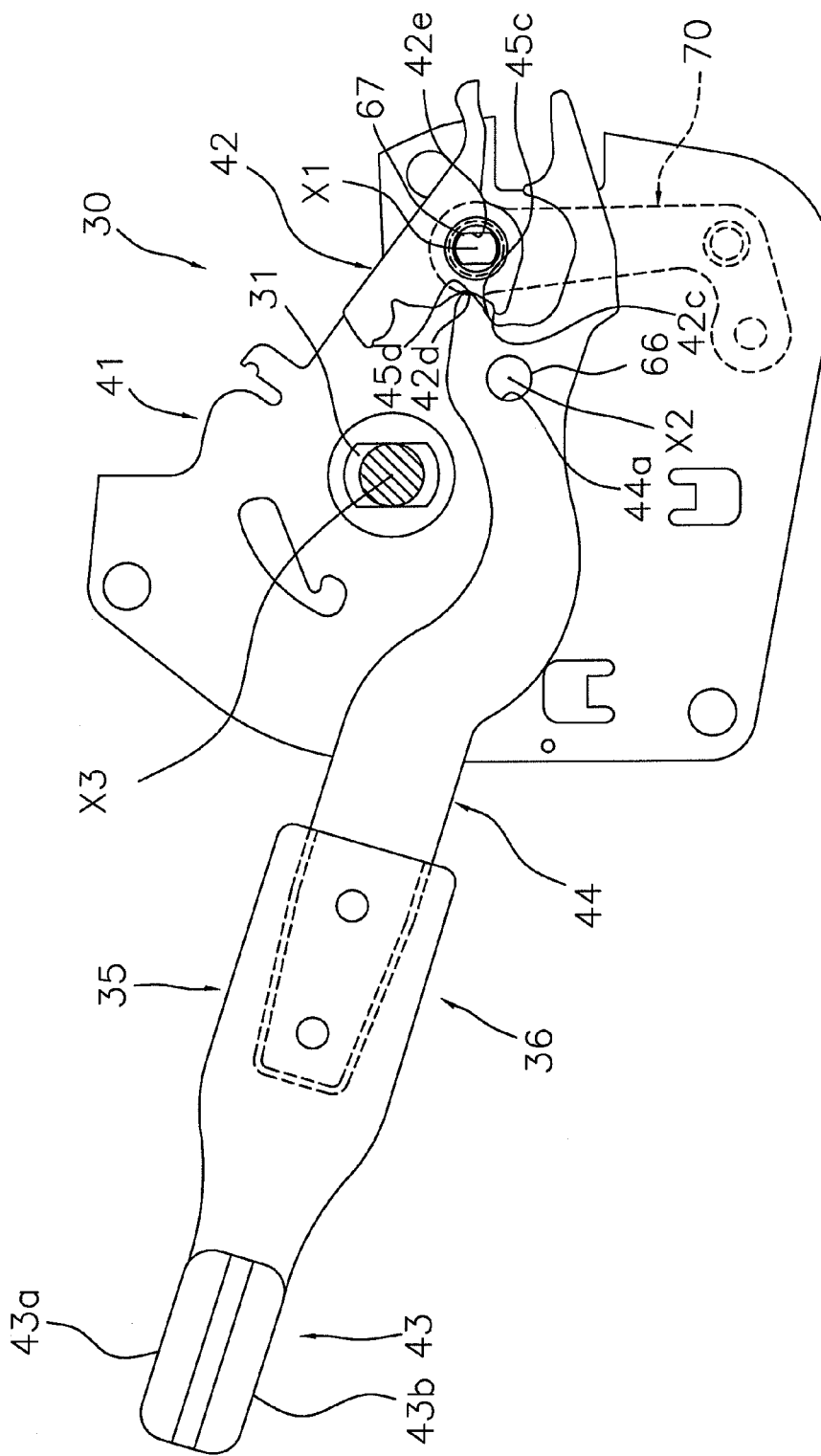
FIG. 9 is a plan view of the rear gear-change operating device when the releasing lever moves two steps in the second direction.

The third contacting part 45c is formed in a rounded shape on the other end of the concave part 44c of the pivot operating part 44b, as shown in FIG. 8. When the lever member 36 pivots in the second direction, the third contacting part 45c contacts the driving member 42 at a position that is a distance R3 from the first axis X1, which is the pivot point of the driving member 42, before the fourth contacting part 45d. The fourth contacting part 45d is formed protruding toward the driving member 42 at a position that is farther removed from a second axis X2 than the third contacting part 45c. The fourth contacting part 45d contacts the driving member 42 at a position that is a distance R4, which is shorter than the distance R3, from the first axis X1 after the lever member 36 has pivoted in a state in which the third contacting part 45c is in contact with the driving member 42. When the lever member 36 pivots further in the second direction after the fourth contacting part 45d has made contact, the third contacting part 45c separates from the driving member 42, as shown in FIG. 9. The point in time when the fourth contacting part 45d contacts the driving member 42 is the point in time when the gear changing operation has moved one stage in the releasing direction due to the releasing operation, which is described hereinafter.

Except for the driving member 42, the driving mechanism 39 is movably linked to the first surface of the attachment bracket 41 at a position removed from the supporting shaft 31, as shown in FIG. 3. The driving member 42 linked to the second surface of the attachment bracket 41 so as to rotate integrally with a pivoting shaft 67, as shown in FIGS. 3 and 5. The pivoting shaft 67 is positioned passing through attachment bracket 41 along the first axis X1 and is rotatably supported by the attachment bracket 41. The pivoting shaft 67 is a shaft member that has a supporting part 67a that is rotatably supported in the center by the attachment bracket 41. The pivoting shaft 67 has two mutually parallel chamfered parts 67b on one end (the upper end in FIG. 3) and two mutually parallel chamfered parts 67c on the other end. The chamfered parts 67c are linked to a first arm member 70 so as to be capable of integral rotation therewith. On the other end, the mutually parallel chamfered parts 67b are linked to the driving member 42 so as to be capable of integral rotation therewith.

The driving member 42 has a slit 42e in the center for engaging and allowing integral rotation with the chamfered parts 67b of the pivoting shaft 67. The driving member 42 sandwiches the slit 42e and extends in a direction away from the first axis X1. First and second contacted parts 42a and 42b are formed on one of the extended portions. The first and second contacting parts 45a and 45b of the lever part 44 contact these contacted parts. Third and fourth contacted parts 42c and 42d are formed on the other extended portion. The third and fourth contacting parts 45c and 45d of the lever part 44 contact these contacted parts.

As shown in FIGS. 3 and 4, the driving mechanism 39 has the first arm member 70 that is linked to the pivoting shaft 67 so as to rotate integrally therewith; and also has the second arm member 71 that is pivotally linked to the first arm member 70. The first arm member 70 has a slit 70a, a linking part 70b and a supporting part 70c. The slit 70a engages with the chamfered parts 67b of the pivoting shaft 67 so as to rotate integrally therewith. The linking part 70b pivotally links the second arm member 71. The supporting part 70c is configured and arranged to limit irregular movement of the first and second arm members 70 and 71 during pivoting. The first arm member 70 pivots integrally with the driving member 42 that pivots due to the operation of the lever member 36. The first arm member 70 is urged in the direction of the positioning member 54 in the counter-clockwise direction of FIG. 4 by a spring member 74 that is fixed to the second arm member 71. This urging force is transmitted to the lever member 36 via the pivoting shaft 67 and the driving member 42, and the lever member 36 is urged toward the neutral position (FIG. 5). A pivoting shaft 68 rises from the linking part 70b. The supporting part 70c is extended so as to overlap the pivoting range of the second arm member 71 and is made to contact the second arm member 71 and prevent irregular movement of the second arm member 71. A contacting protrusion 70d is formed on the lower surface of the supporting part 70c for contacting the first surface of the attachment bracket 41. Irregular movement of the first arm member 70 during pivoting can thereby also be minimized. The pivoting range of the first arm member 70 is restricted so as to allow pivoting to the position shown in FIG. 14.

The second arm member 71 has a plurality of (e.g., two) operating parts 71a and 71b on the end. Due to the operating parts 71a and 71b, one operation of the lever member 36 in the first or second direction allows the driving mechanism 39 to perform a maximum of two multi-stage releasing operations, i.e., a continuous gear-changing process across two gears. For example, the rear derailleur 18 can upshift due to the motion of the inner cable 26a in the wire releasing direction, and a gear-changing operation can be made at once to ninth-gear when the current gear is seventh. The number of operating parts is not limited to two. Multi-stage releasing operations can be performed in accordance with the number of operating parts if the number of operating parts is increased.

As shown in FIG. 10, the operating parts 71a and 71b both have an engaging part 72, and an engagement-releasing part 73. The engaging part 72 is configured and arranged to engage the engagement protrusion 56d of the positioning pawl 56. The engagement-releasing part 73 is configured and arranged to release the engagement of the engaging part 72 and the positioning pawl 56 when the releasing cam part 57c makes contact due to the pivoting of the rotation-preventing pawl 57 within the prescribed range. The engagement-releasing part 73 is provided adjoining the engaging part 72. The second arm member 71 is urged in the direction of the positioning pawl 56 by the spring member 74, which has the form of, e.g., a coil spring. The first arm member 70 is also urged in the direction of the positioning member 54 by the spring member 74 as described above, and the lever member 36 is also urged toward the neutral position by the spring member. One end of the spring member 74 is fixed to an interlocking pin 71d that protrudes toward the attachment bracket 41 near the operating part 71a of the second arm member 71, and the other end is fixed to a spring bearing 41b of the attachment bracket 41. The spring member 74 therefore urges all three of the members 71, 70 and 36.

The winding lever 38 is not shown in FIG. 3 but is positioned above the positioning member 54 in FIG. 3. The winding lever 38 is mounted on the supporting shaft 31 so as to be able to pivot from the operation-initiating position in the direction of operation completion. The winding pawl 59 is pivotally positioned in the middle of the winding lever 38 as described above and as shown in FIG. 4. The winding lever 38 is urged toward the operation-initiating position by a spring member that is not shown.

Except for the number of gears, the front gear-change operating device 15 is a mirror image of the rear gear-change operating device 16 and has the same configuration. The front gear-change operating device is provided to the inside of the rear brake lever 12.

Operation in the wire releasing direction is as follows. As shown in FIG. 6, when the lever member 36 is operated in the first direction from the neutral position (FIG. 5), the lever member 36 pivots around the pivoting shaft 66 in the counter-clockwise direction of FIG. 6. When the lever member 36 pivots, the pivoting causes the driving member 42 to be pressed against the urging force of the spring member 74 in a state in which the first contacting part 45*a* is in contact with the first contacted part 42*a* of the driving member 42, and the driving member 42 is made to pivot in the counter-clockwise direction of FIG. 5. When the driving member 42 pivots, the first arm member 70 pivots via the pivoting shaft 67 around the first axis X1 in the clockwise direction of FIG. 4 and away from the positioning member 54.

Figure 11:
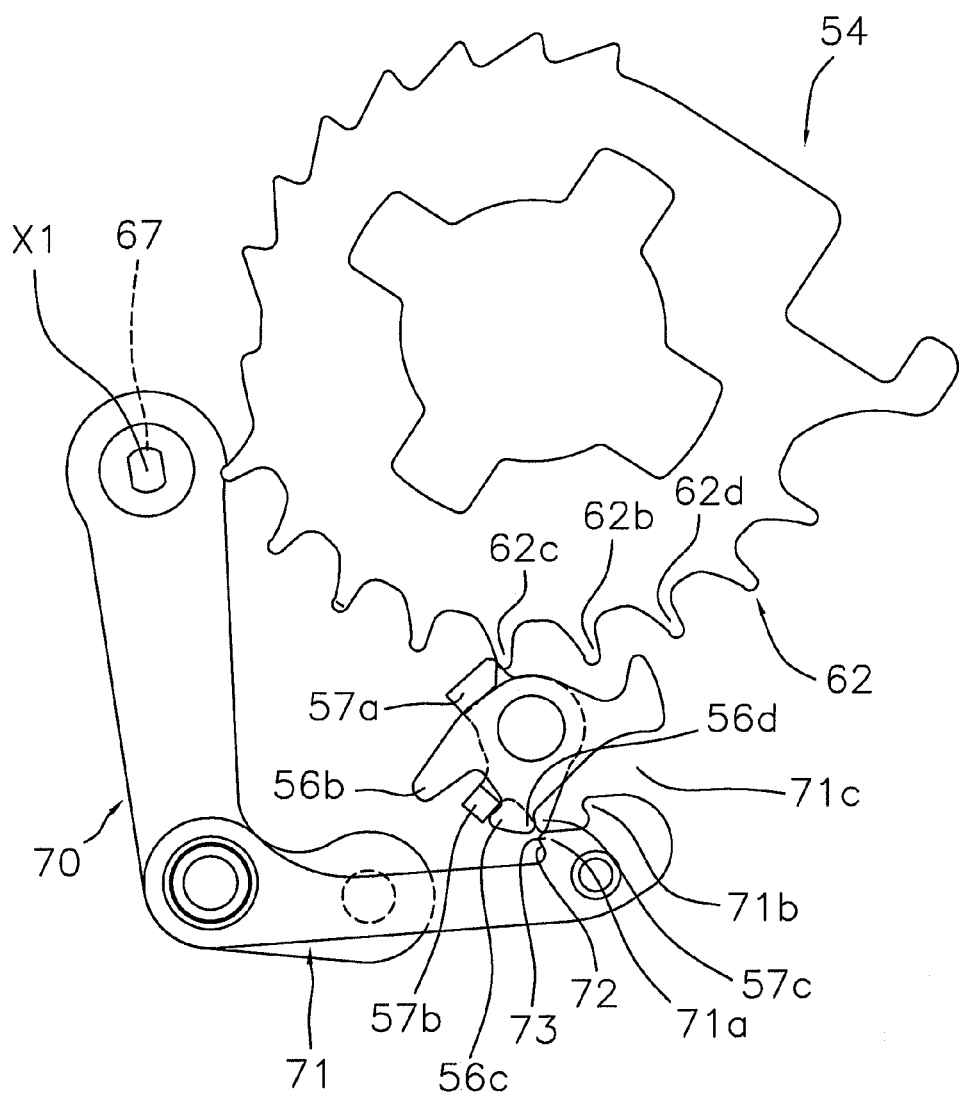
FIG. 11 is a partial plan view of selected parts of the rear gear-change operating device showing part of the wire releasing operation.
Figure 12:
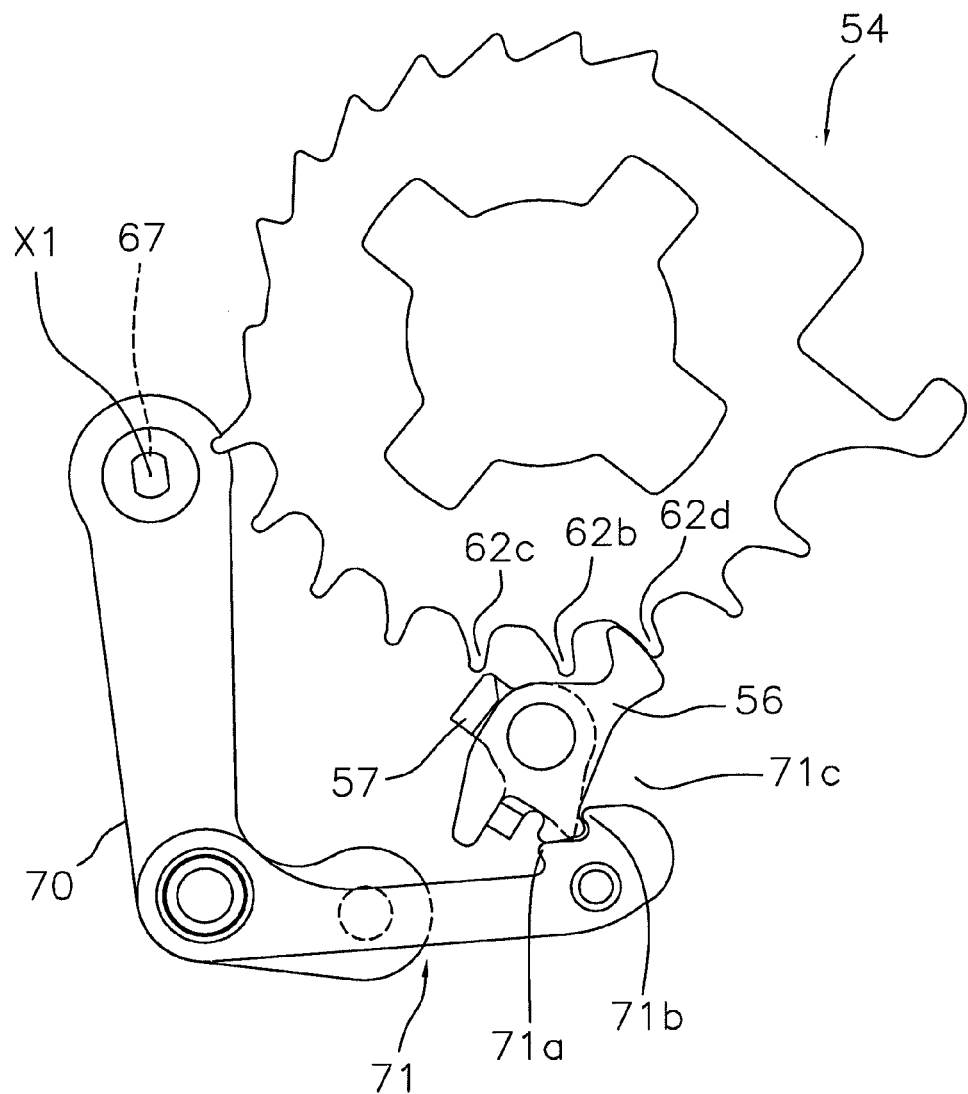
FIG. 12 is a partial plan view of selected parts of the rear gear-change operating device showing part of the wire releasing operation.

When the first arm member 70 pivots away from the positioning member 54, the engaging part 72 of the operating part 71*a* of the second arm member 71 engages with the engagement protrusion 56*d* of the positioning pawl 56, and the positioning pawl 56 is made to pivot in the clockwise direction of FIG. 4 around the pivoting shaft 65 from the first engagement position shown in FIG. 4 to the first releasing position shown in FIG. 10. The operating part 71*a* also contacts the releasing cam part 57*c* of the rotation-preventing pawl 57 at this point and causes the rotation-preventing pawl 57 to rotate from the second releasing position shown in FIG. 4 to the second engagement position shown in FIG. 10. As a result, the positioning member 54, which is urged in the wire releasing direction in the clockwise direction in FIG. 10 by the spring member 50 via the wire takeup member 32, rotates in the wire releasing direction, and the positioning tooth 62*c*, which is the next tooth downstream in the direction of rotation from the positioning tooth 62*b* that is held in place by the positioning pawl 56, contacts the second pawl part 57*a* of the rotation-preventing pawl 57. The rotation-preventing pawl 57 can pivot within a prescribed range relative to the positioning pawl 56, and therefore the rotation-preventing pawl 57 that is pressed by the positioning tooth 62*c* then pivots in the counter-clockwise direction of FIG. 10. The releasing cam part 57*c* of the rotation-preventing pawl 57 then presses the engagement-releasing part 73 of the operating part 71*a*, and the engagement of the engaging part 72 and the positioning pawl 56 on the second arm member 71 is released, as shown in FIG. 11. The positioning pawl 56, which is urged by the spring member 58, thereby moves from the first releasing position to the first engagement position. The positioning pawl engages with the positioning tooth 62*d* on the first-stage cable releasing side, and the releasing operation for first gear is completed. This state is shown in FIG. 12. The positioning member 54 in FIG. 12 has rotated in the wire releasing direction by the amount of one gear change relative to FIG. 4.

The first and second contacting parts 45*a* and 45*b* of the lever member 36 and the first and second contacted parts 42*a* and 42*b* of the driving member 42 are formed so the first and second contacting parts 45*a* and 45*b* contact the first and second contacted parts 42*a* and 42*b* in this state, as shown in FIG. 6.

As shown in FIG. 7, when the lever member 36 is made to continue and pivot further in the first direction in this state, the first contacting part 45*a* separates from the first contacted part 42*a*, and the lever member 36 presses on the driving member 42 and causes the driving member to pivot further in the counter-clockwise direction of FIG. 7 in a state in which the second contacting part 45*b* is in contact with the second contacted part 42*b*. The first arm member 70 thereby pivots further in the direction away from the positioning member 54.

Figure 13:
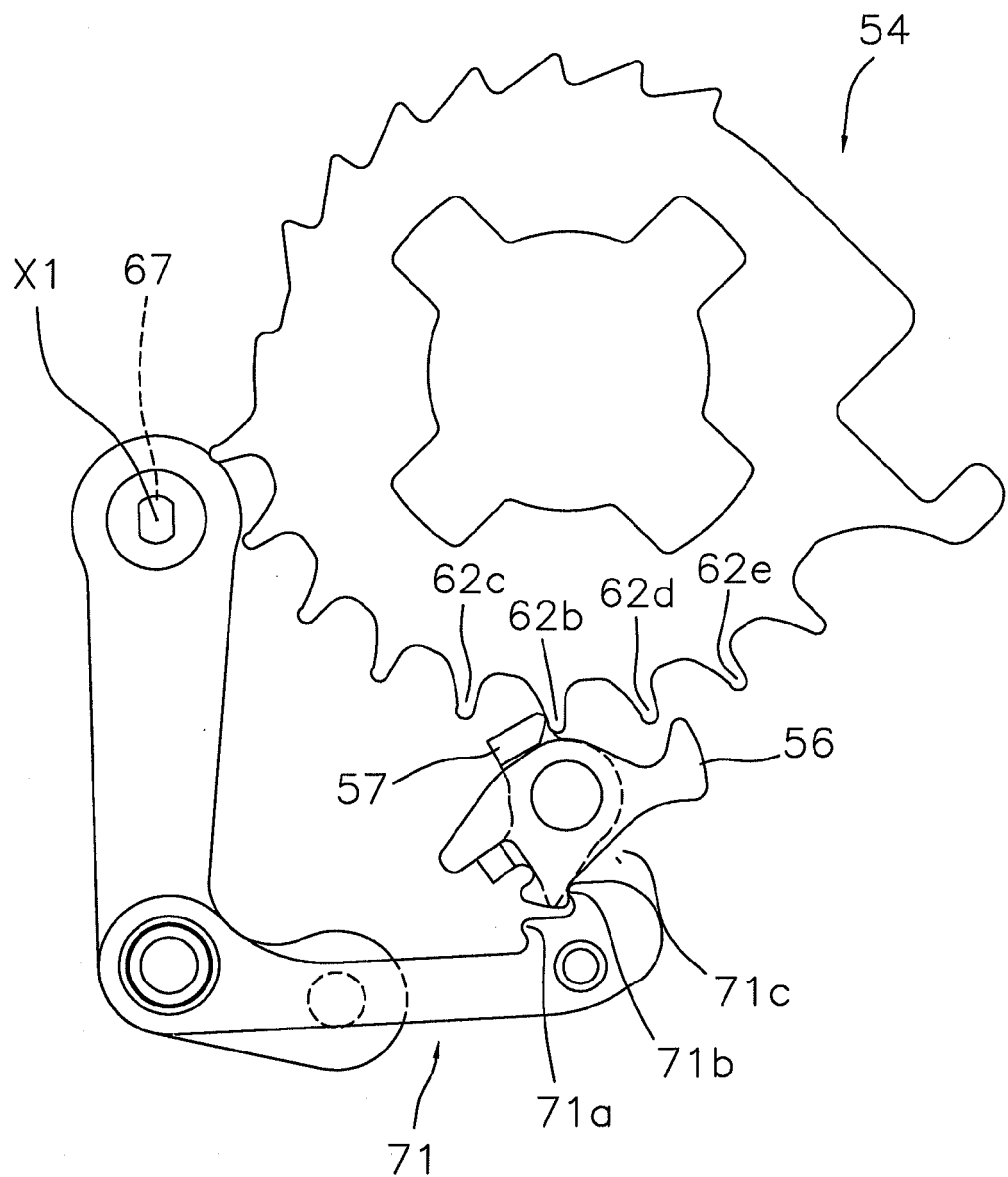
FIG. 13 is a partial plan view of selected parts of the rear gear-change operating device showing part of the wire releasing operation.
Figure 14:
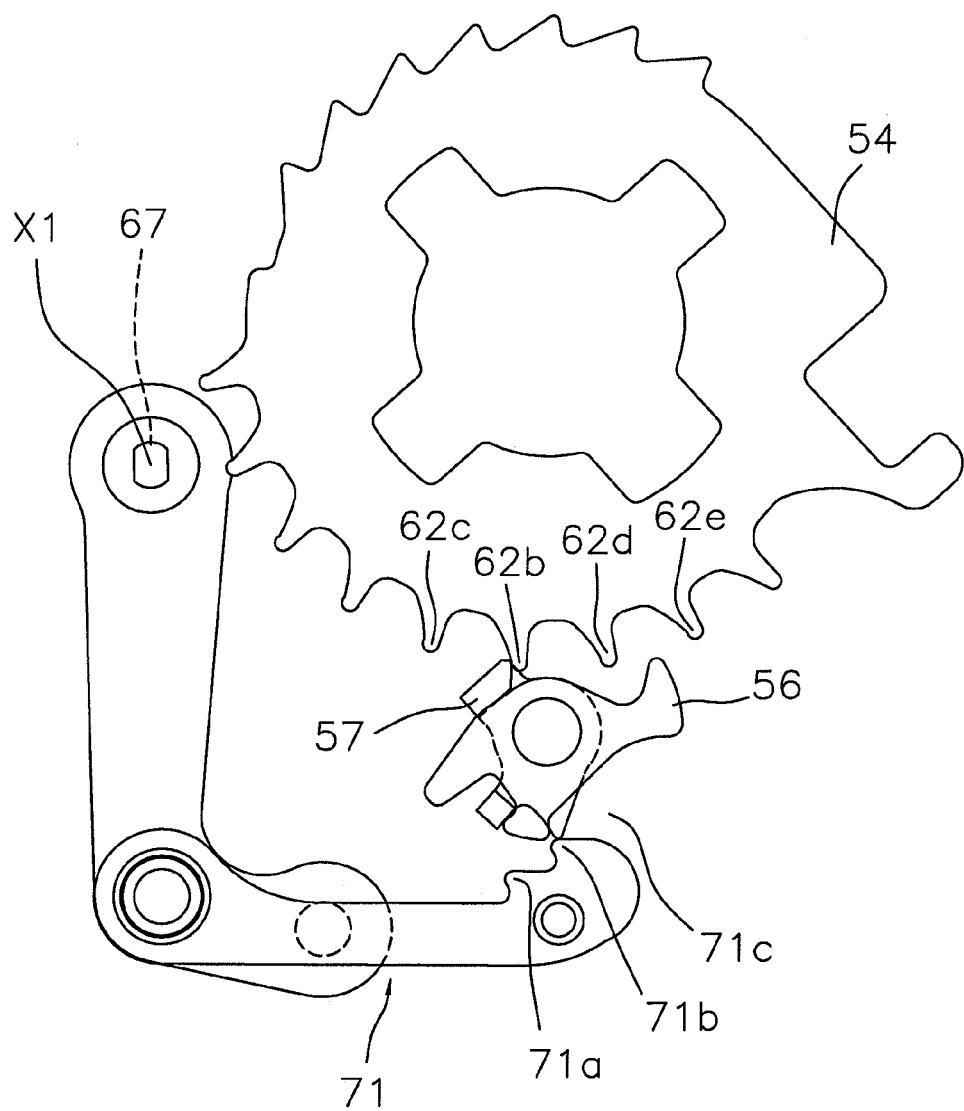
FIG. 14 is a partial plan view of selected parts of the rear gear-change operating device showing part of the wire releasing operation.

As shown in FIGS. 13 and 14, when the first arm member 70 pivots further in the direction away from the positioning member 54, the operating part 71*b* causes the positioning pawl 56 to pivot to the first releasing position in the same manner as the above described operation. The positioning member 54 rotates in the wire releasing direction, the positioning tooth 62*b* further presses the rotation-preventing pawl 57 and causes the rotation-preventing pawl 57 to pivot in the prescribed range, and the engagement between the operating part 71*b* and the positioning pawl 56 is released. As a result, the positioning member 54 rotates further in the first-gear wire releasing direction until the positioning pawl 56 contacts the positioning tooth 62*e*.

During this second releasing operation, the second contacting part 45*b* presses the driving member 42 at the second contacted part 42*b*, which is closer to the first axis X1 that is the pivot point of the driving member 42 than the position at which the first contacting part 45*a* makes contact. The arm length during pressure by the second contacting part 45*b* (distance R2) is therefore shorter than the arm length during pressure by the first contacting part 45*a* (distance R1). The operating force on the lever member 36 necessary for the rotation of the first arm member 70 and the driving member 42 against the urging force of the spring member 74 therefore increases, and the second releasing operation experiences sudden resistance. Specifically, the force necessary for operation also slowly increases in accordance with the operation stroke of the lever member 36 during the single-stage releasing operation, but the operating force changes discontinuously at the point in time when the second contacting part 45*b* begins to press the driving member 42, i.e., when entering the second releasing operation. The rider can use such a discontinuous change in the operating force to recognize that a single-stage wire releasing operation has completed. A single-stage releasing operation can be reliably performed by ending the gear-changing operation using the lever member 36 at the point in time when the operation faces sudden resistance. The state of the driving member 42 and the lever member 36 at this point is as shown in FIG. 7.

As shown in FIG. 8, when the lever member 36 is operated in the second direction from the neutral position (FIG. 5), the lever member 36 pivots in the clockwise direction of FIG. 8 around the pivoting shaft 66. When the lever member 36 pivots in the clockwise direction of FIG. 8, the pivoting causes the driving member 42 to be pressed against the urging force of the spring member 74 in a state in which the third contacting part 45*c* is in contact with the third contacted part 42*c* of the driving member 42, and the driving member 42 is made to pivot in the counter-clockwise direction of FIG. 5. When the driving member 42 pivots, the first arm member 70 pivots via the pivoting shaft 67 around the first axis X1 in the clockwise direction of FIG. 4 and away from the positioning member 54 in the same manner as operation in the first direction. When the first arm member 70 pivots in the clockwise direction of FIG. 4 to position shown in FIG. 12 in the same manner as the above described operation, the positioning member 54 rotates in the wire releasing direction by the amount of one gear change relative to FIG. 4.

The third and fourth contacting parts 45*c* and 45*d* of the lever member 36 and the third and fourth contacted parts 42*c* and 42*d* of the driving member 42 are formed so the third and fourth contacting parts 45*c* and 45*d* contact the third and fourth contacted parts 42*c* and 42*d* in this state, as shown in FIG. 8.

As shown in FIG. 9, when the lever member 36 is made to continue and pivot further in the second direction in this state, the third contacting part 45*c* separates from the third contacted part 42*c*, and the lever member 36 presses on the driving member 42 and causes the driving member to pivot further in the counter-clockwise direction of FIG. 9 in a state in which the fourth contacting part 45*d* is in contact with the fourth contacted part 42*d*. The first arm member 70 thereby pivots further in the direction away from the positioning member 54.

When the first arm member 70 pivots further in the direction away from the positioning member 54, the positioning member 54 rotates further in the first-gear wire releasing direction until the positioning pawl 56 contacts the positioning tooth 62e.

During this second releasing operation, the fourth contacting part 45d also presses the driving member 42 at the fourth contacted part 42d, which is closer to the first axis X1 that is the pivot point of the driving member 42 than the position at which the third contacting part 45c makes contact. The arm length during pressure by the fourth contacting part 45d (distance R4) is therefore shorter than the arm length during pressure by the third contacting part 45c (distance R3). The operating force on the lever member 36 necessary for the rotation of the first arm member 70 and the driving member 42 against the urging force of the spring member 74 therefore increases, and the second releasing operation experiences sudden resistance. The rider can use such a discontinuous change in the operating force to recognize that a single-stage wire releasing operation has completed. In this instance, as well, a single-stage releasing operation can be reliably performed by ending the gear-changing operation using the lever member 36 at the point in time when the operation faces sudden resistance. The state of the driving member 42 and the lever member 36 at this point is as shown in FIG. 9.

When the hand is removed from the lever member 36 and the releasing operation is ended, the second arm member 71, which is urged by the spring member 74, returns to the position shown in FIG. 4. The second arm member 71 returns to the position of FIG. 4 while contacting the outer-circumferential part of the restricting protrusion 56c of the positioning pawl 56, but does not act on the positioning pawl 56 at this point. The releasing cam part 57c of the rotation-preventing pawl 57 is formed so as to be hidden by the restricting protrusion 56c in this state, and therefore the rotation-preventing pawl 57 is also not acted upon. A wire releasing operation is therefore not performed.

Operation in the wire winding direction is as follows. When the winding lever 38 is operated from the operation-initiating position toward the operation-completing position, the winding pawl 59 presses the winding teeth 64, and the positioning member 54 rotates in the wire winding direction (the counter-clockwise direction in FIG. 4). The positioning teeth 62 then contact the positioning pawl 56, and the positioning pawl 56 is pressed toward the first releasing position. However, when the pressed positioning teeth 62 surpass the positioning pawl 56, the positioning pawl 56 returns to the first engagement position. When the winding lever 38 is operated to the operation-completing position, a multi-stage winding operation can be performed having, e.g., four stages. The operating force during operation in the wire winding direction does not change between operations for one gear and operations for multiple gears.

In this instance, the plurality of operating parts 71a and 71b, which are positioned in line with the second arm member 71 of the driving mechanism 39 that is positioned away from the supporting shaft 31, are engaged with the positioning pawl 56, whereby the positioning pawl 56 is made to pivot to the first releasing position. The rotation-preventing pawl 57 moves within the prescribed range, whereby the engagement between the second arm member 71 and the positioning pawl 56 is released, and the positioning pawl 56 is made to pivot to the first engagement position. A structure for multi-stage release is therefore not positioned on the supporting shaft 31, on which are positioned the positioning member 54 and the wire takeup member 32. Increases in the axial length of the supporting shaft 31 can therefore be limited, and multi-stage release is possible without increasing the thickness of the rear gear-change operating device 16.

The first and second contacting parts 45a and 45b and the third and fourth contacting parts 45c and 45d contact the driving member 42 at positions that are at different distances from the pivot point (the first axis X1) of the driving member 42. The arm length when the first or third contacting member 45a and 45c, which is farther from the pivot point of the driving member 42, contacts the driving member 42 will therefore be longer than when the closer second or fourth contacting part 45b and 45d makes contact, and the driving member 42 can be made to pivot using a weaker force. The operating force is therefore lightened when pivoting is caused by the far first or third contacting part 45a and 45c, and the force for operating the second pivoting member will change according to whichever of the contacting parts is in contact. Therefore, the positions of the first and second contacting parts 45a and 45b and the third and fourth contacting parts 45c and 45d are set so that contact is made using a different contacting part when changing from a single-stage operation to a continuous two-stage operation, whereby the operating force of the lever member 36 can be made to change at the point in time when the single-stage operation ends. A single-stage operation can thereby be performed by ending the operation at the point in time when the operating force changes, and an operation across multiple stages can be performed by continuing operation even after the change. Single-stage operations and operations across multiple stages can therefore be reliably performed.

According to the above described embodiment, the contacting parts are configured as protruding parts provided to the second pivoting member (the lever member 36), but protruding parts may also be provided to the first pivoting member (the driving member 42), and the contacting parts may be configured as flat surfaces or the like.

According to the above described embodiment, operation in the wire releasing direction can be performed by operation in both the first and second directions, but operation in the wire releasing direction may also be performable using operation in only one direction.

The first arm member 70 and the driving member 42 are linked via the pivoting shaft 67 so as to be capable of integral rotation in the above described embodiment, but the first arm member 70 and the driving member 42 may also be formed integrally.

The above described embodiment is configured so that the operating force of the winding lever 38 does not change between single-stage operation and multi-stage operation, but the operating force may also be made to change in the winding lever 38.

Figure 15:
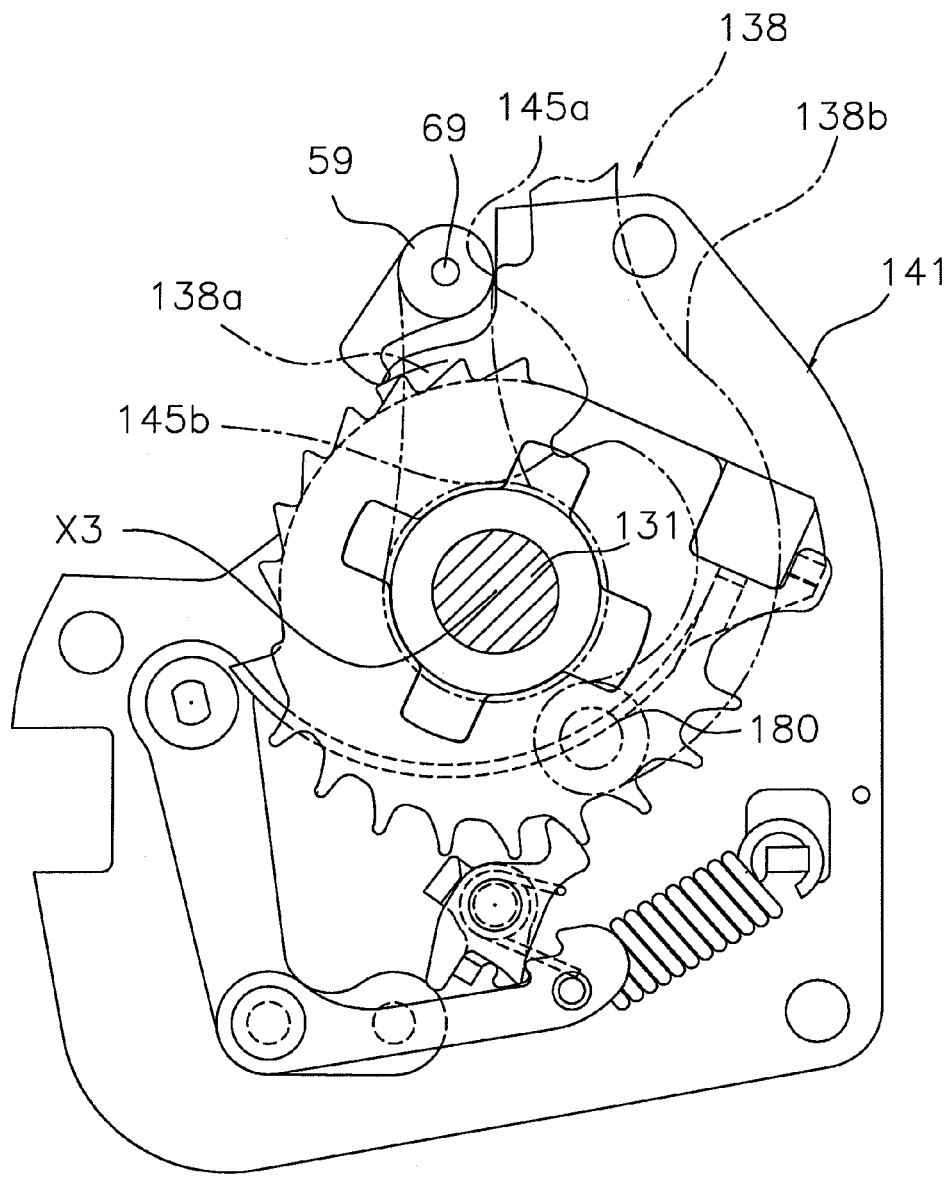
FIG. 15 is a plan view, similar to FIG. 4, of selected parts of a rear gear-change operating device in accordance with another embodiment when the positioning pawl is in the first engagement position.
Figure 16:
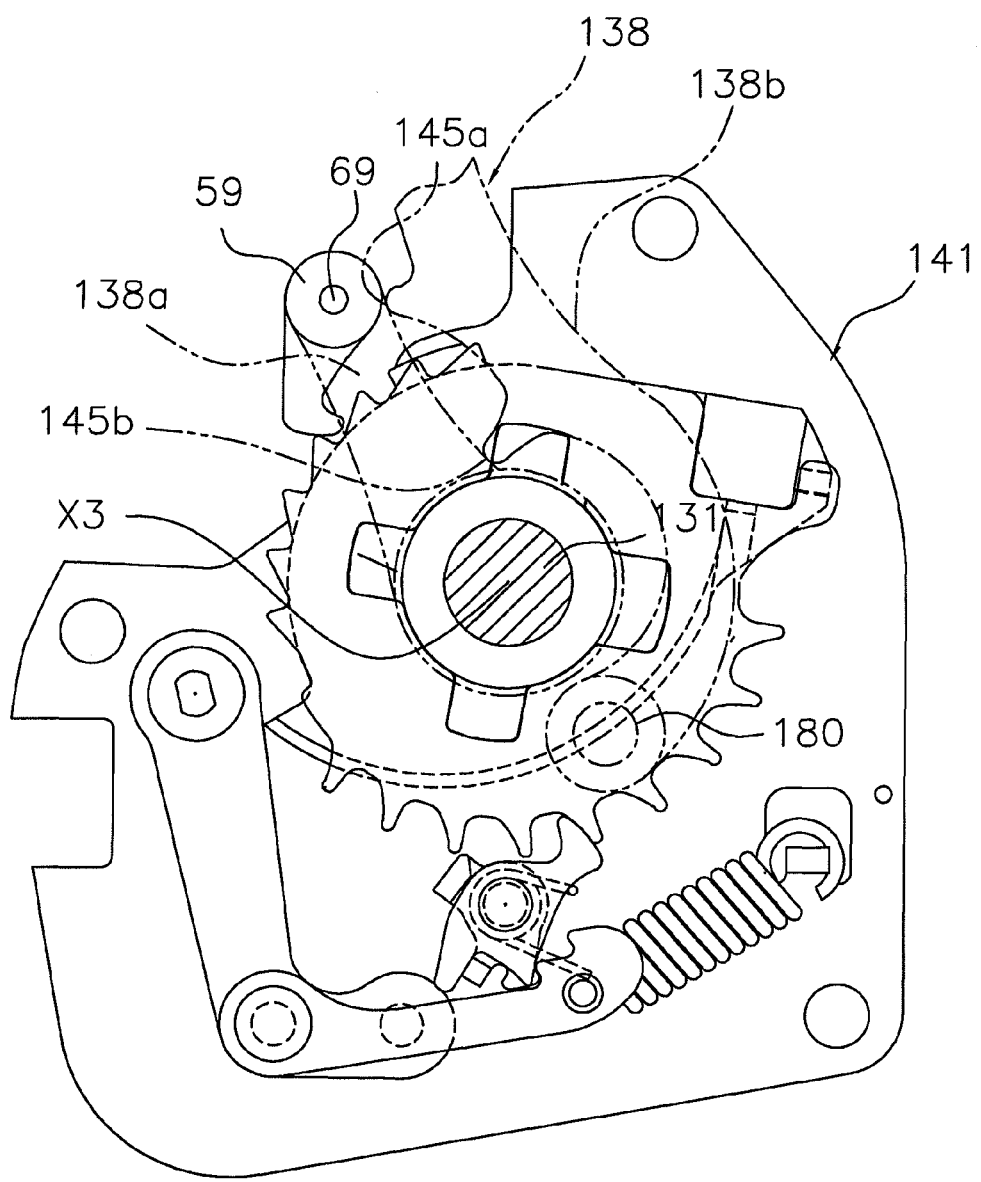
FIG. 16 is a plan view of selected parts of the rear gear-change operating device illustrated in FIG. 15 showing a single-stage wound state.

Referring now to FIGS. 15 and 16, a rear gear-change operating device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As shown in FIGS. 15 and 16, for example, a winding lever 138 has a first lever member 138a and a second lever member 138b. The first lever member 138 is an example of a first pivoting member on which the winding pawl 59 is pivotally mounted via the pivoting shaft 69. The second lever member 138b is an example of a second pivoting member that is pivotally supported by an attachment bracket 141 at a position different from the first lever member 138a. The first lever member 138a is pivotally supported by a supporting shaft 131. The first lever member 138a is urged toward the operation-initiating position by a spring member that is not shown. The second lever member 138b is pivotally supported by a pivoting shaft 180 that rises from the attachment bracket 141 at a position removed from the supporting shaft 131. The pivoting shaft 180 is positioned on the opposite side from the end of the first lever member 138a of the supporting shaft 131. The second lever member 138b has first and second contacting parts 145a and 145b that are capable of contacting the first lever member 138a. The first contacting part 145a contacts the first lever member 138a at a position that is at a distance farther removed from the third axis X3 of the supporting shaft 131, which acts as the pivot point of the first lever member 138a, than the second contacting part 145b. When the second lever member 138b is operated, the first contacting part 145a makes initial contact, and the second contacting part 145b makes contact once the single-stage gear-changing operation finishes. The operating force of the winding operation thereby also changes between single-stage gear-changing operations and gear-changing operations of two or more stages in the same manner as the above described embodiment. Specifically, a single-stage gear-changing operation can be performed using a light operating force, and the operating force faces resistance at the second and subsequent stages.

The above described embodiment was exemplified using the gear-change operating device of an externally mounted gear-changing device having a front derailleur and a rear derailleur, but the present invention may also be applied to the gear-change operating device of an internally mounted gear-changing device having an internally mounted gear-changing hub. The bicycle operating device according to the present invention is also not limited to gear-change operating devices. Any operating device may be used as long as the operation of the device is related to a bicycle and proceeds through multiple steps. For example, the present invention may also be applied to devices for manipulating the characteristics of the suspension (e.g., hardness) through a plurality of steps.

The wire takeup member 32 for winding the wire was given as an example of the movable member in the above described embodiment, but the movable member according to the present invention is not limited to wires and can also be, e.g., a hydraulic piston in a gear-changing system that employs hydraulic oil.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle operating device comprising:
a fixed member configured to be attached to a bicycle;
a movable member movably coupled to the fixed member;
a positioning mechanism operatively arranged to selectively maintain the movable member in any one of a plurality of holding positions;
a driving mechanism including a first pivoting member pivotally mounted with respect to the fixed member to pivot about a first axis to operatively engage the positioning mechanism; and
a second pivoting member pivotally mounted with respect to the fixed member to pivot from a neutral position about a second axis that is offset from the first axis, the second pivoting member including first and second contacting parts for selectively contacting the first pivoting member at different radial positions that are at different radial distances from the first axis of the first pivoting member, with the first and second contacting parts contacting the first pivoting member causing the first pivoting member to pivot in response to the second pivoting member being pivoted about the second axis in a first direction,
the second pivoting member causing the first pivoting member to rotate in a single direction on the first axis in response to the second pivoting member being pivoted from the neutral position in the first direction on the second axis, and the second pivoting member causing the first pivoting member to rotate on the first axis in the single direction in response to the second pivoting member being pivoted from the neutral position in a second direction on the second axis which is opposite the first direction, the second pivoting member being urged to the neutral position by the driving mechanism.

2. The bicycle operating device according to claim 1, wherein
the first contacting part of the second pivoting member is arranged to contact the first pivoting member at a position that is farther from the first axis than the second contacting part, and
the first contacting part of the second pivoting member is further arranged to initially cause the first pivoting member to pivot in response to the second pivoting member being initially pivoted about the second axis in the first direction, and then the second contacting part of the second pivoting member causes the first pivoting member to pivot in response to further pivotal movement of the second pivoting member pivoting about the second axis in the first direction.

3. The bicycle operating device according to claim 2, wherein
the positioning mechanism and the first pivoting member are arranged such that the movable member is moved by one increment in response to die first pivoting member being initially pivoted by the first contacting part.

4. The bicycle operating device according to claim 3, wherein
the positioning mechanism and the first pivoting member are arranged such that the movable member is moved by one more increment in response to the first pivoting member being initially pivoted by the second contacting part.

5. The bicycle operating device according to claim 4, wherein the second pivoting member further comprises third and fourth contacting parts that selectively contact the first pivoting member at different radial positions that are at different radial distances from the first axis of the first pivoting member; and the second pivoting member is further arranged such that one of the third and fourth contacting parts contacts the first pivoting member causing the first pivoting member to pivot in response to the second pivoting member being pivoted in the second direction.

6. The bicycle operating device according to claim 5, wherein the third contacting part of the second pivoting member is arranged to contact the first pivoting member at a position that is farther from the first axis than the fourth contacting part, and the third contacting part of the second pivoting member is further arranged to initially cause the first pivoting member to pivot in response to the second pivoting member being initially pivoted about the second axis in the second direction, and then the fourth contacting part of the second pivoting member causes the first pivoting member to pivot in response to further pivotal movement of the second pivoting member pivoting about the second axis in the second direction.

7. The bicycle operating device according to claim 1, wherein the second pivoting member further comprises third and fourth contacting parts that selectively contact the first pivoting member at different radial positions that are at different radial distances from the first axis of the first pivoting member; and the second pivoting member is further arranged such that one of the third and fourth contacting parts contacts the first pivoting member causing the first pivoting member to pivot in response to the second pivoting member being pivoted in the second direction.

8. The bicycle operating device according to claim 7, wherein the third contacting part of the second pivoting member is arranged to contact the first pivoting member at a position that is farther from the first axis than the fourth contacting part, and the third contacting part of the second pivoting member is further arranged to initially cause the first pivoting member to pivot in response to the second pivoting member being initially pivoted about the second axis in the second direction, and then the fourth contacting part of the second pivoting member causes the first pivoting member to pivot in response to further pivotal movement of the second pivoting member pivoting about the second axis in the second direction.

9. The bicycle operating device according to claim 1, wherein the first and second contacting parts are disposed on an outer peripheral edge of the second pivoting member.

10. The bicycle operating device according to claim 1, wherein the positioning mechanism includes a positioning member and a positioning pawl, with the positioning pawl being mounted on a positioning pawl pivot axis that is offset from the first and second axes.

11. A bicycle operating device comprising:

a movable member movably coupled to a fixed member;

a positioning mechanism operatively arranged to selectively maintain the movable member in any one of a plurality of holding positions;

a first pivoting member pivotally mounted with respect to the fixed member to pivot about a first axis to operatively engage the positioning mechanism; and a second pivoting member pivotally mounted with respect to the fixed member to pivot from a rest position about a second axis that is offset from the first axis, the second pivoting member including first and second contacting parts for selectively contacting the first pivoting member at different radial positions that are at different radial distances from the first axis of the first pivoting member, with the first and second contacting parts contacting the first pivoting member causing the first pivoting member to pivot in response to the second pivoting member being pivoted about the second axis in a first direction, the second pivoting member causing the first pivoting member to rotate in a single direction on the first axis in response to the second pivoting member being pivoted from the rest position in the first direction on the second axis, and the second pivoting member causing the first pivoting member to rotate on the first axis in the single direction in response to the second pivoting member being pivoted from the rest position in a second direction on the second axis which is opposite the first direction, the first and second axes being parallel.

* * * * *